(12) United States Patent
Jiang et al.

(10) Patent No.: US 10,511,256 B2
(45) Date of Patent: Dec. 17, 2019

(54) SOLAR PANEL CLEANING ROBOT

(71) Applicant: SUZHOU RADIANT PHOTOVOLTAIC TECHNOLOGY CO., LTD, Suzhou (CN)

(72) Inventors: Changsheng Jiang, Suzhou (CN); Jiayong Jiang, Suzhou (CN); Jianrong Xu, Suzhou (CN)

(73) Assignee: SUZHOU RADIANT PHOTOVOLTAIC TECHNOLOGY CO., LTD, Suzhou (CN)

( * ) Notice: Subject to any disclaimer, the term of this patent is extended or adjusted under 35 U.S.C. 154(b) by 0 days.

(21) Appl. No.: 15/744,870

(22) PCT Filed: Jan. 26, 2017

(86) PCT No.: PCT/CN2017/072769
§ 371 (c)(1),
(2) Date: Jan. 15, 2018

(87) PCT Pub. No.: WO2018/053986
PCT Pub. Date: Mar. 29, 2018

(65) Prior Publication Data
US 2018/0241343 A1    Aug. 23, 2018

(30) Foreign Application Priority Data

Sep. 21, 2016 (CN) .......................... 2016 1 0836028

(51) Int. Cl.
*H02S 40/10* (2014.01)
*B25J 9/16* (2006.01)
(Continued)

(52) U.S. Cl.
CPC .............. *H02S 40/10* (2014.12); *B08B 1/002* (2013.01); *B08B 1/04* (2013.01); *B08B 13/00* (2013.01); *B25J 9/1679* (2013.01); *B25J 9/1689* (2013.01); *F24S 40/20* (2018.05); *H04N 5/225* (2013.01); *H04N 5/2257* (2013.01); *B08B 3/02* (2013.01);
(Continued)

(58) Field of Classification Search
CPC ....... H02S 40/10; B25J 9/1679; B25J 9/1689; B25J 5/005; B08B 1/002; B08B 1/04; B08B 13/00; B08B 2203/0211; B08B 3/02; B08B 3/024; H04N 5/225; H04N 5/2257; F24S 40/20; Y10S 901/01
See application file for complete search history.

(56) References Cited

U.S. PATENT DOCUMENTS 5,569,371 A * 10/1996 Perling ................. E04H 4/1654
15/1.7
8,813,303 B1    8/2014 Meller et al.
(Continued)

FOREIGN PATENT DOCUMENTS

CN      201354829 Y    12/2009
CN      101632992 A     1/2010
(Continued)

*Primary Examiner* — Benjamin L Osterhout
(74) *Attorney, Agent, or Firm* — Mark M. Friedman

(57) ABSTRACT

A solar panel cleaning robot is provided and has a robot body. The robot body can move on at least one solar panel. A cleaning device, a power system, a control system and an electric power system are disposed on an internal or an external of the robot body.

19 Claims, 21 Drawing Sheets

(51) Int. Cl.
    *B08B 1/00*         (2006.01)
    *B08B 1/04*         (2006.01)
    *B08B 3/02*         (2006.01)
    *H04N 5/225*       (2006.01)
    *B08B 13/00*       (2006.01)
    *F24S 40/20*       (2018.01)
    *B25J 5/00*         (2006.01)

(52) U.S. Cl.
    CPC ....... *B08B 3/024* (2013.01); *B08B 2203/0211* (2013.01); *B25J 5/005* (2013.01); *Y10S 901/01* (2013.01)

(56) References Cited

U.S. PATENT DOCUMENTS

| | | | | |
|---|---|---|---|---|
| 2006/0184293 | A1* | 8/2006 | Konandreas | A47L 11/4072 701/23 |
| 2007/0061040 | A1* | 3/2007 | Augenbraun | A47L 5/225 700/245 |
| 2010/0037418 | A1* | 2/2010 | Hussey | A47L 5/30 15/319 |
| 2013/0104321 | A1* | 5/2013 | Michelon | E04H 4/1654 15/1.7 |
| 2013/0206173 | A1* | 8/2013 | Zijlstra | B08B 1/008 134/6 |
| 2014/0100698 | A1* | 4/2014 | Suresh | H02S 40/10 700/275 |
| 2015/0134179 | A1* | 5/2015 | Murakami | A47L 9/009 701/23 |
| 2015/0314453 | A1* | 11/2015 | Witelson | B25J 11/00 320/108 |
| 2015/0362921 | A1* | 12/2015 | Hanaoka | G01B 11/24 701/23 |
| 2016/0000290 | A1* | 1/2016 | Kwak | A47L 11/4011 700/253 |
| 2016/0274579 | A1* | 9/2016 | So | A47L 9/2852 |
| 2016/0363930 | A1* | 12/2016 | Kwak | G05D 1/0231 |
| 2017/0070189 | A1* | 3/2017 | Hartman | H02S 40/10 |
| 2017/0102709 | A1* | 4/2017 | Kwak | A47L 11/4011 |
| 2017/0112344 | A1* | 4/2017 | Koura | A47L 11/4008 |
| 2017/0131721 | A1* | 5/2017 | Kwak | B25J 9/1664 |
| 2017/0157775 | A1 | 6/2017 | Miyake et al. | |
| 2017/0163209 | A1* | 6/2017 | Bailey | H02S 40/34 |
| 2017/0273528 | A1* | 9/2017 | Watanabe | A47L 9/00 |

FOREIGN PATENT DOCUMENTS

| | | |
|---|---|---|
| CN | 102319698 A | 1/2012 |
| CN | 103904989 A | 7/2014 |
| CN | 204679974 U | 9/2015 |
| CN | 204776539 U | 11/2015 |
| CN | 204810222 U | 11/2015 |
| CN | 105149253 A | 12/2015 |
| CN | 204822698 U | 12/2015 |
| CN | 204948013 U | 1/2016 |
| CN | 105658345 A | 6/2016 |
| CN | 105703703 A | 6/2016 |
| CN | 105881555 A | 8/2016 |
| CN | 105897146 A | 8/2016 |
| CN | 205440601 U | 8/2016 |
| CN | 106180033 A | 12/2016 |
| CN | 106182015 A | 12/2016 |
| CN | 106238369 A | 12/2016 |
| CN | 106269624 A | 1/2017 |
| CN | 206153189 U | 5/2017 |
| CN | 206153190 U | 5/2017 |
| CN | 206154318 U | 5/2017 |
| CN | 206156051 U | 5/2017 |
| KR | 101106732 B1 | 1/2012 |
| WO | 2015199198 A1 | 12/2015 |

\* cited by examiner

SOLAR PANEL CLEANING ROBOT

FIELD OF INVENTION

The present invention relates to cleaning robot fields, especially to a solar panel cleaning robot.

BACKGROUND OF INVENTION

As fossil fuels are in a decline, new renewable solar energy has become an important part of energy used by humans, as solar energy technology has been rapidly developed in all countries in the world over the past decade. A solar panel refers to a device that converts solar energy directly into electrical energy using semiconductor materials that generate photovoltaic (PV) effect when exposed to sunlight. The solar panels are suitable for applications ranging from large power stations to small portable chargers. In recent years, the solar panels have had rapid development.

Work environment of the solar panels can only be outdoors, where a biggest problem affecting their work is not thunderstorms, but dust that has accumulated over the years. The dust or other adhesion attached to the solar panel may affect light transmittance of the panel and limit photoelectric efficiency, which will seriously affect efficiency of the panel directly obtaining the sunlight, reduce panel energy absorption and conversion efficiency, and reduce power generation efficiency.

Conventional solar panels in use can only rely on regular completion of manual cleaning work. Because of larger solar panels, large power stations use more panels at the same time, dust will be accumulated repeatedly, and repeated cleaning is required. Therefore, labor costs are high, cleaning efficiency is low, and cleaning effect is poor. In many occasions, in order to improve space utilization rate, solar panels are set in high places by mounting brackets, which brings more difficulty and risks for cleaning. In order to reduce cleaning costs, many users of the solar panels can only choose not to clean, and therefore can only be forced to bear the power loss caused by dust. Thus, a new automatic cleaning device is needed for automatic cleaning the solar panels.

Conventional cleaning robots can only be applied to level surfaces instead of being applied to sloping planes of the solar panels. Applying the conventional cleaning robots directly to the solar panels will result in the following issues.

(1) The cleaning robot has insufficient mobility and cannot move freely. The cleaning effect is poor. Since the tilt angle of the solar panel is generally from 10 to 40 degrees, the conventional cleaning robot cannot freely move on the sloping plane and will soon run out of power.

(2) The cleaning robot may slide and fall down from the solar panel. Because the solar panel is relatively smooth, the weight of the conventional cleaning robot and friction coefficient of the wheel are relatively low, the friction force is relatively low, and the moving robot moves with difficulty and slips down easily.

(3) The cleaning robot cannot follow the prescribed route, move in a small coverage area, and may fall from an edge of the solar panel. The conventional cleaning robot is generally set to automatically turn and bypass obstacles encountered. Because the solar panel does not have any obstacles, the automatically moving cleaning robot can only moving on a single path, its coverage area during moving is small and the cleaning robot will inevitably fall from the edge of the solar panel. Even with a pre-planned path, existing cleaning robots, during moving, are susceptible to gravity and the panel attachments can also easily deviate from the path, making it difficult to ensure straight-line travel. Furthermore, the cleaning robot itself cannot detect and cannot move through the entire panel, which leaves a lot of room for cleaning.

(4) Recharging the cleaning robot is difficult. Since the solar panel is relatively high and is large in area, it is more difficult to remove the cleaning robot therefrom once the cleaning robot has been sent up. In the prior art, manually removing the cleaning robot from the site or manually removing the battery the cleaning robot and then charging it is necessary, which makes the cleaning robot unable to be sustained on-site operations for a long time. Moreover, because many of the solar panels are set high with the bracket, so charging operation is very troublesome and wasting a lot of manpower.

(5) Monitoring a working status of the cleaning robot is difficult. As the solar panel may be set high, a staff member on the ground cannot monitor the whole process. Even though the cleaning robot fails, stops to operate or deviates from the route, a staff member is unable to be aware of it in time.

SUMMARY OF INVENTION

An objective of the present invention is to provide a solar panel cleaning robot to solve the technical issues of high labor costs and poor cleaning effect existing in a conventional manually cleaning method.

To solve the above issue, the present invention provides a solar panel cleaning robot comprising a robot body, and the robot body can move on at least one solar panel. A cleaning device, a power system, a control system and an electric power system are disposed on an internal or an external of the robot body. The cleaning device is configured to clean the solar panel; the power system is configured to adjust a moving direction and a moving speed of the robot body on the solar panel. The control system is connected to the power system and the cleaning device. The control system transmits at least one moving-control instruction to the power system, and the power system controls the robot body to move according to the moving-control instruction. The control system transmits at least one cleaning-control instruction to the cleaning device, and the cleaning device cleans or stops cleaning the solar panel according to the cleaning-control instruction. The electric power system connected to the power system, the cleaning device and the control system, and is configured to provide the power system, the cleaning device and the control system with electricity.

Another objective of the present invention is to provide a solar panel cleaning robot to solve the technical issue that the conventional cleaning robot moves hardly on a slope and easily falls off.

To solve the above issues, the present invention provides a solar panel cleaning robot, wherein the power system includes a left-front wheel installed on a left side of a front portion of a bottom surface of the robot body and including: a left-front wheel hub; and a left-front wheel axis disposed on a center of the left-front wheel hub; a right-front wheel installed on a right side of the front portion of the robot body and including: a right-front wheel hub; and a right-front wheel axis disposed on a center of the right-front wheel hub; a left-drive motor installed on a bottom portion of the robot body and including a left-drive shaft securely connected to the left-front wheel axis and configured to control a rotating speed and a rotational direction of the left-front wheel; and a right-drive motor installed on the bottom portion of the robot body and including a right-drive shaft securely connected to the right-front wheel axis and configured to control a rotating speed and a rotational direction of the right-front wheel.

Another objective of the present invention is to provide a solar panel cleaning robot to solve the technical issue that the conventional cleaning robot moves in a small coverage area and falls from an edge of the solar panel.

To solve the above issue, the present invention provides a solar panel cleaning robot, wherein the control system includes: a data acquisition system configured to acquire at least one working parameter during moving of the robot body; a processor connected to the data acquisition system, and configured to transmit at least one moving-control instruction to the power system, and to transmit at least one cleaning-control instruction to the cleaning device; and at least one storage system, connected to the processor, and configured to store the working parameter during the moving of the robot body.

Another objective of the present invention is to provide a solar panel cleaning robot to solve the technical issue of difficulty of monitoring the working status of the conventional cleaning robot on the solar panel.

To solve the above issue, the present invention provides a solar panel cleaning robot, includes at least one wireless communication system wirelessly connected to a server and configured to build communication between the solar panel cleaning robot and the server.

Another objective of the present invention is to provide a solar panel cleaning robot to solve the technical issue of difficulty of recharging the conventional cleaning robot on the solar panel.

To solve the above issue, the present invention provides a solar panel cleaning robot, wherein the electric power system further includes at least one wireless charging system including: a rechargeable battery disposed on the internal of the robot body and configured to provide power; at least one wireless power transmitting device disposed on the external of the robot body; each wireless power transmitting device including a transmitting coil, and the transmitting coil connected to a power source; and a wireless power receiving device disposed on the external or an outer surface of the robot body; the wireless power receiving device including a receiving coil, and the receiving coil connected to the rechargeable battery; wherein when the receiving coil is located above the transmitting coil, the receiving coil and the transmitting coil implement electromagnetic induction coupling or magnetic resonance coupling such that the transmitting coil transmits wireless electric power to the receiving coil.

Advantage of the present invention is to provide a solar panel cleaning robot that may freely move on the solar panel and effectively remove the dust on the panel and other attachments, and decontamination effect thereof is excellent. During operation of the cleaning robot of the present invention on the solar panel, the cleaning robot can non-repeatedly cover the entire space of the solar panel according to the preset optimized path with high working efficiency. The cleaning robot of the present invention can automatically turn or back turn according to the program to achieve automatic control and is easy to operate. The cleaning robot of the present invention can accomplish automatic charging on the solar panel without repeatedly remove the cleaning robot from the solar panel, which reduces operation processes and lowers maintenance difficulty and operation risks and save a lot of labor costs.

Figure 1:
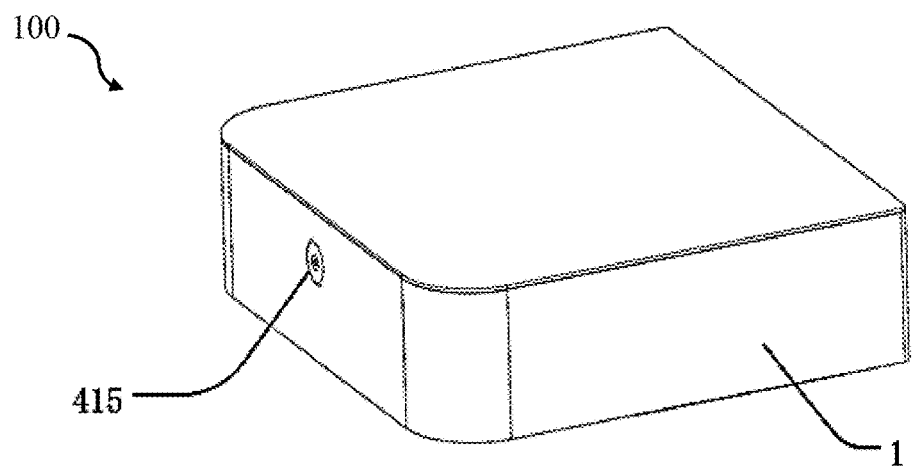
FIG. 1 is an overall appearance schematic view of a cleaning robot of an embodiment 1 of the present invention.

100 solar panel cleaning robot/cleaning robot/robot, 200 solar panel, 300 sloping plane, 400 server, 500 charging panel;

1 robot body, 2 cleaning device, 3 power system, 4 control system, 5 electric power system, 6 wireless charging system; 11 body member;

21 cleaning motor, 22 roller brush, 23 transmission mechanism, 24 debris baffle, 25 liquid dispensing container, 26 nozzle head, 27 forked pipe, 28 water pump;

31 left-front wheel, 32 right-front wheel, 33 left-rear wheel, 34 right-rear wheel, 35, left-drive motor, 36 right-drive motor, 37 track, 38 hub gear, 39 track tension device;

41 data acquisition unit, 42 processor, 43 storage unit, 44 alarm unit, 45 wireless communication unit; 51 battery box;

61 wireless power transmitting device, 62 wireless power receiving device, 63 wireless communication system;

201 gap on a connection portion of the solar panels;

211 cleaning motor shaft, 221 roller brush driven shaft, 231 drive gear, 232 driven gear, 233 double gear;

251 drainage outlet, 252 column-shaped portion, 253 taper portion, 254 container cover, 255 fill inlet, 256 fill inlet lid, 257 bidirectional pressure relief valve, 258 annular lid opening, 259 liquid level sensor;

261 nozzle, 271 main pipe;

311 left-front wheel hub, 312 left-front wheel axis, 321 right-front wheel hub, 322 right-front wheel axis, 331 left-rear wheel hub, 341 right-rear wheel hub;

371 track housing, 372 track inner tooth, 373 skid-proof block, 374 upper transmission belt, 375 lower transmission belt;

391 upper tension portion, 392 lower compression portion, 393 resilient support portion, 394 track side plate, 395 track top plate, 396 longitudinal slot, 397 installing shaft, 398 gear bracket;

411 accelerometer sensor, 412 magnetic sensor, 413 distance sensor, 414 counter, 415 image sensor;

611 transmitting coil, 612 DC power source, 613 inverter circuit, 614 transmitting terminal controller;

621 receiving coil, 622 rechargeable battery, 623 rectifier circuit, 624 DC-DC conversion circuit, 625 receiving terminal controller, 626 battery information collector, 627 wireless charging switch, 628 battery manager;

631 transmitting terminal signal importing unit, 632 transmitting terminal signal exporting unit, 633 receiving terminal signal importing unit, 634 receiving terminal signal exporting unit;

2331 large gear ring, 2332 small gear ring;

2541 connection slot hole, 2591 longitudinal rod, 2592 float sensor, 2593 disc-shaped connector, 2594 annular block, 2595 wire;

2571 valve body, 2572 valve chamber, 2573 sealing valve block, 2574 sealing stopper, 2575 first vent hole, 2576 second vent hole, 2577 first resilient element, 2578 second resilient element, 2579 annular shoulder portion;

3911 V-shaped bracket, 3912 tension transmission wheel, 3913 tension gear, 3914 V-shaped planar plate, 3915 crossbeam, 3916 cylindrical gear, 3917 cylindrical linkage portion;

3921 tension compression plate, 3931 reverse V-shaped resilient element;

3971 gear installation shaft, 3972 transmission-wheel installation shaft;

6121 solar energy generator module, 6122 DC-DC voltage stabilizing circuit, 6123 AC power source, 6124 AC-DC adapter.

DETAILED DESCRIPTION OF PREFERRED EMBODIMENTS

A preferred embodiment of the present invention will be introduced with reference to appended figures as follows to demonstrate that the present invention may be implemented. The embodiment of the present invention can be fully introduced to those skilled in the art to make technical contents more clear and easy to understand. The present invention can be embodied in many different forms of embodiment, and the scope of protection of the present invention is not limited to the embodiments set forth herein.

In the appended figures, structurally identical components are designated by the same reference numerals, and structurally or functionally similar components throughout are designated by similar numerical reference numerals. The dimensions and thicknesses of each component shown in the figures are arbitrarily shown. The size and thickness of each component are not limited, and for the sake of clarity, the thickness of the components is exaggerated somewhat in some places in the figures.

Direction terms mentioned by the present invention, for example "upper", "lower", "front", "rear", "left", "right", "inner", "outer", "side", etc. are merely directions in the appended figures for only explaining and illustrating the present invention but not to limit the protection scope of the present invention.

When some part is described to be "on" another part, the part may be directly disposed on the other part; alternatively, an intervening part may exist, the part is disposed on the intervening part, and the intervening part is disposed on the other part. When a part is described to be "installed on" or "connected to" another part, it may be understood that the parts are directly "installed" or "connected" to each other, alternatively it is understood that one part is "installed" or "connected" to the other part through an intervening part.

Embodiment 1

Figure 2:
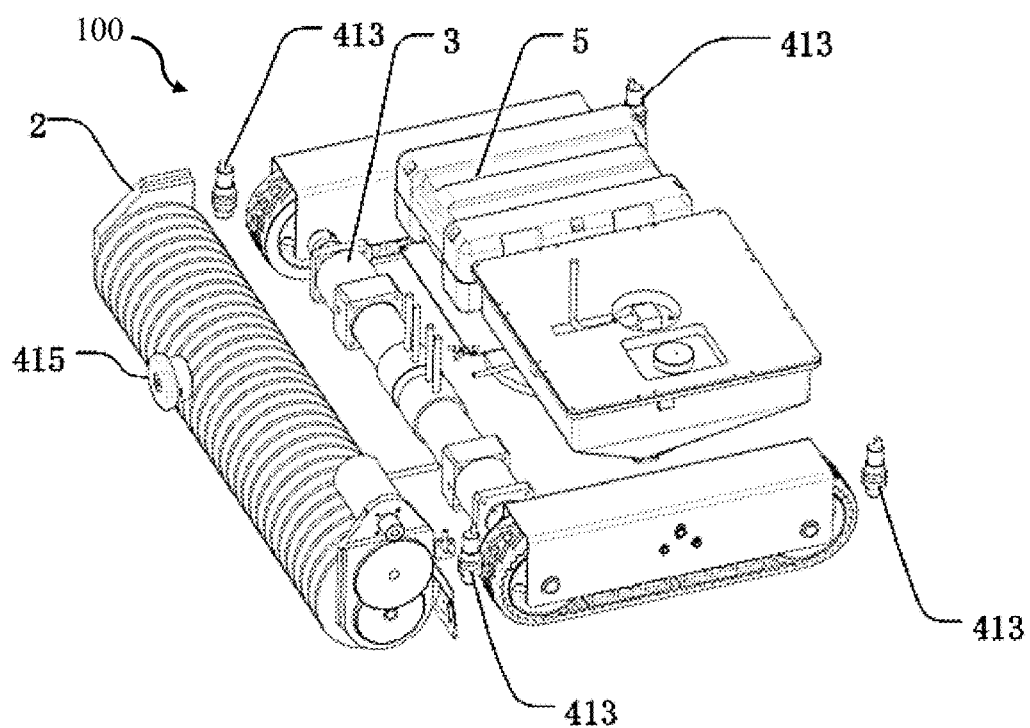
FIG. 2 is an internal structure schematic view of the cleaning robot of the embodiment 1 of the present invention.
Figure 3:
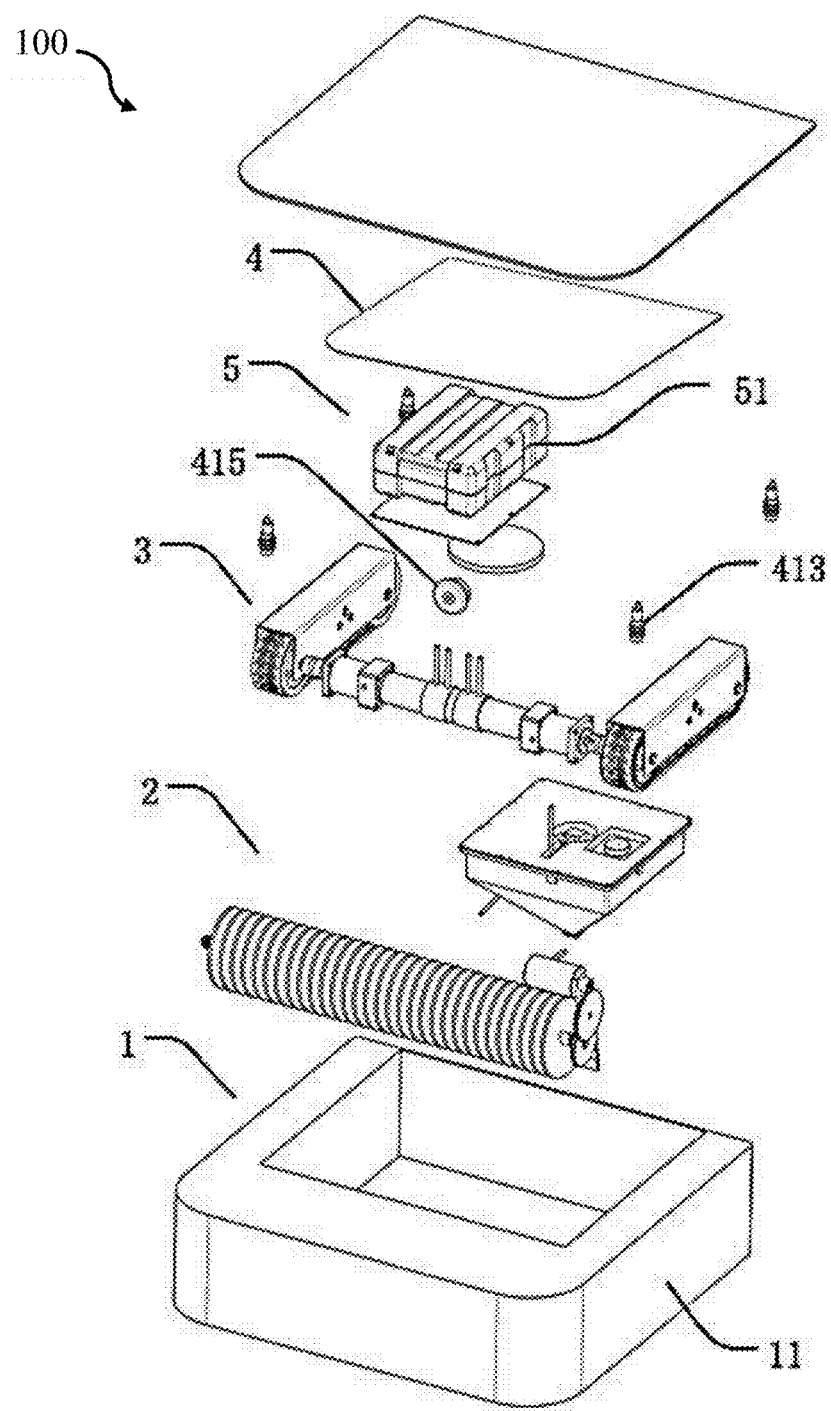
FIG. 3 is an exploded structure schematic view of the cleaning robot of the embodiment 1 of the present invention.

With reference to FIGS. 1 to 3, the present embodiment provides a solar panel cleaning robot 100 (abbreviated as "cleaning robot" and "robot" hereinafter) includes a robot body 1. The robot body 1 can move on at least one solar panel 200. A cleaning device 2, a power system 3, a control system 4 and an electric power system 5 are disposed on an internal or an external of the robot body 1.

The cleaning device 2 is configured to clean solar panel 200 when the robot body 1 is moving. The power system 3 is configured to adjust a moving direction and a moving speed of the robot body 1 on the solar panel 200, and to control the robot body 1 to move, stop or turn; the control system 4 is connected to the power system 3 and the cleaning device 2, and is configured to transmit various control signals to the power system 3 and the cleaning device 2. The electric power system 5 is connected to the power system 3, the cleaning device 2 and the control system 4, and is configured to provide the power system 3, the cleaning device 2 and the control system 4 with electricity.

During normal work of the solar panel cleaning robot 100 of the present embodiment on the solar panel 200, when the electric power system 5 is switched on, the control system 4 transmits at least one moving-control instruction and at least one cleaning-control instruction, the power system 3 controls the robot body to move along a predetermined path according to the moving-control instruction. In the meantime, the cleaning device 2 switches on the cleaning device 2 according to the cleaning-control instruction to clean the solar panel 200. During moving of the robot body 1, the control system 4 transmits multiple moving control instructions, such as deflection correction instruction, turn instruction and U-turn instruction, etc. to the power system 3 to command the robot body 1 to return to an original path in the case of deflection of straight path., i.e. deflection correction. Alternatively, under a certain condition or a certain place, a turn or U-turn (turning back) is performed such that the robot body 1 is driven to move according to a pre-planned optimized path. Specific navigation methods, deflection correction methods and turn or U-turn (turning back) controlling methods for the robot body will be described in detail below. During the entire moving process, no matter what moving mode the robot body 1 proceeds with, such as straight moving, deflection, deflection correction, turn or U-turn, the cleaning device 2 always remains in working status. When the control system 4, based on certain working parameters (for example, the pre-planned path is finished, or the electric power system 5 has insufficient power), transmits a moving control instruction to stop moving, the robot body 1 stops moving; meanwhile, the control system 4 transmits a cleaning control instruction to switch off the cleaning device 2 to stop cleaning.

Figure 4:
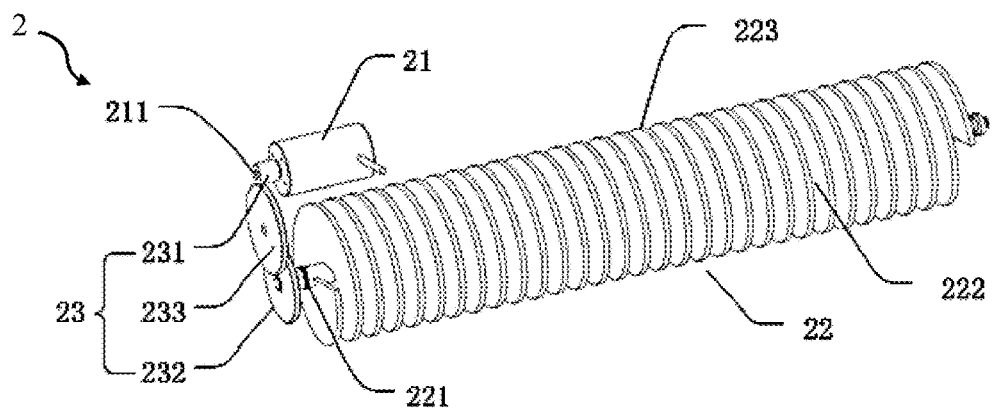
FIG. 4 is a structure schematic view of the cleaning device of the embodiment 1 of the present invention.

With reference to FIG. 4, the cleaning device 2 of the present embodiment comprises a cleaning motor 21, a roller brush 22 and a transmission mechanism 23.

Figure 5:
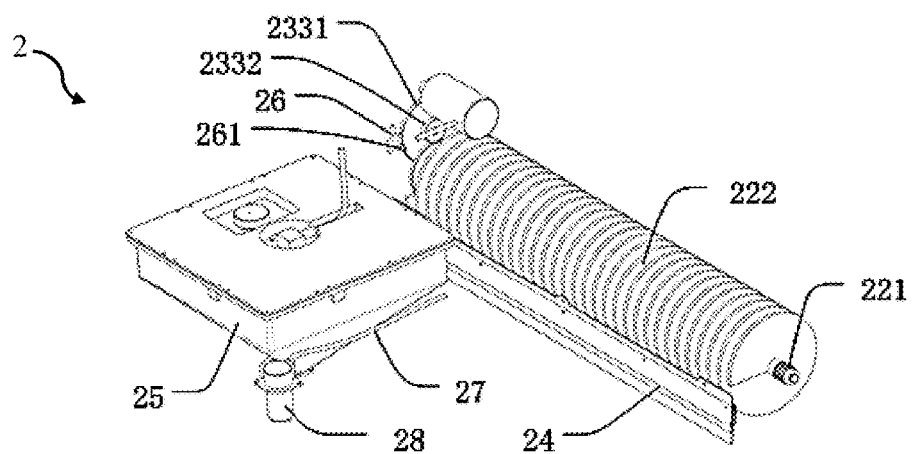
FIG. 5 is another structure schematic view of the cleaning device of the embodiment 1 of the present invention.

With reference to FIGS. 4 and 5, in the present invention, the cleaning motor 21 includes a cleaning motor shaft 211. A roller brush driven shaft 221 is disposed on a center of the roller brush. The transmission mechanism 23 is simultaneously connected to the cleaning motor shaft 211 and the roller brush driven shaft 221, the cleaning motor shaft 211 drives the roller brush driven shaft 221 to rotate through the transmission mechanism 23. The roller brush 22 is disposed a lower portion of a front end of the robot body 1. A lower end of the roller brush 22 directly contacts the solar panel 200 for cleaning the solar panel 200.

The transmission mechanism 23 is a gear set composed of two or more large and small gears engaged with each other, and is configured to transmit power of the cleaning motor shaft 211 to the roller brush driven shaft 221 while decreasing the rotating speed output by the cleaning motor 21 such that the roller brush 22 is driven to rotate by the slower rotating speed. In the present invention, the transmission mechanism 23 includes a drive gear 231, a driven gear 232 and a double gear 233. The drive gear 231 is disposed on the cleaning motor shaft 211. The cleaning motor shaft 211 is perpendicular to a gear surface of the drive gear 231. The driven gear 232 is disposed on the roller brush driven shaft 221. The roller brush driven shaft 221 is perpendicular to a gear surface of the driven gear 232. The roller brush driven shaft 221 parallels the cleaning motor shaft 211. The double gear 233 includes a large gear ring 2331 and a small gear ring 2332 that are integrally formed together. The large gear ring 2331 is engage with the drive gear 231. The small gear ring 2332 is engaged with the driven gear 232. When the cleaning motor 21 is switched on, the cleaning motor shaft 211 rotates at high speed. After deceleration process by the double gear 233, the roller brush driven shaft 221 drives the roller brush 22 to rotate with a slower speed such that the roller brush 22 can clean the solar panel 200. A rotating speed ratio of the cleaning motor shaft 211 and the roller brush driven shaft 221 depends on a radius ratio of the large gear ring 2331 and the small gear ring 2332.

The roller brush 22 is a helical roller brush, the helical roller brush includes at least one helical blade 222. The helical blade 222 may have multiple sheet-like bladelets 223. The bladelets 223 are equally spaced apart from one another such that the roller brush 22 and the solar panel fully contact each other, and the parts of the solar panel on which the robot body 1 have passed through can be cleaned. During the moving of the robot body 1 of the present invention, the roller brush 22 constantly cleans attachments such as dust on the solar panel.

With reference to FIG. 5, the cleaning device 2 further includes a debris baffle 24 securely installed on a side surface of the roller brush 22. The roller brush driven shaft 221 in the center of the roller brush 22 parallels the debris baffle 24. With reference to FIG. 2, the cleaning device 2 is disposed on a front end (i.e. front portion of the robot body) of the cleaning robot 100. A rear end (i.e. rear portion of the robot body) of the cleaning robot 100 includes a body member 11. The debris baffle 24 is disposed between the cleaning device 2 and body member 11. During the cleaning, the debris baffle 24 can effectively collect dust, debris, sewage and other debris together to easily remove them from the surface, and can prevent debris from entering the cleaning device 2 or the power system 3 to protect parts in the robot body 1 from damages.

With reference to FIG. 5, the cleaning device 2 further includes a liquid dispensing container 25, at least one nozzle head 26 and a forked pipe 27.

With reference to FIGS. 5 to 10, the liquid dispensing container 25 (may be abbreviated as "container 25") is a detachable sealing container for storing water or detergent solution, and a drainage outlet is disposed on a bottom of the liquid dispensing container 25. The nozzle head 26 is disposed on an upper portion or a side portion of the roller brush 22. Each nozzle head 26 includes a nozzle, and the nozzle faces the roller brush 22. The forked pipe 27 includes a main pipe and at least one branch pipe (not shown in the figures) communicating with each other. The main pipe 271 communicates with the drainage outlet. Each branch pipe communicates with one nozzle head 26. In the present invention, two nozzle heads 26 are preferably disposed respectively on two ends of the roller brush 22, the nozzles face the roller brush 22. The forked pipe 27 is preferably a forked pipe including one main pipe 271 and two branch pipes, and conveys the water or detergent solution in the liquid dispensing container 25 to the two nozzle heads 26.

Figure 6:
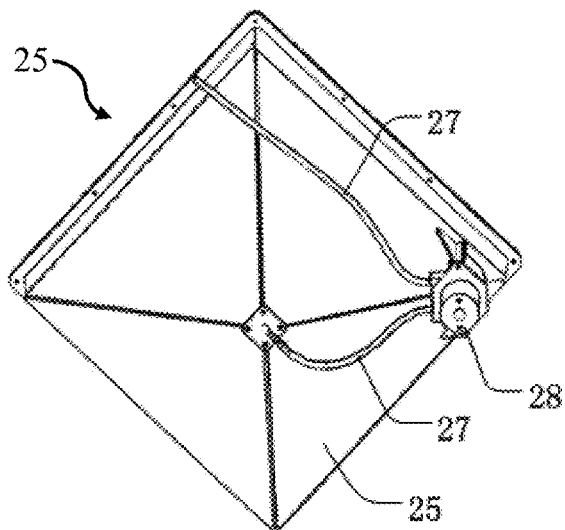
FIG. 6 is a bottom structure schematic view of the liquid dispensing container of the embodiment 1 of the present invention.

With reference to FIGS. 5 and 6, the cleaning device 2 further includes a water pump 28 connected to the control system 4 and acquiring at least one water pump control signal from the control system 4. The water pump 28 is disposed on the main pipe 271, and serves as a switch for controlling the liquid dispensing container 25 to discharge liquid and adjusting discharging speed of liquid according to the water pump control signal.

In the present invention, during the roller brush 22 cleaning the solar panel 200, the control system 4, according to requirement, transmits at least one water pump control signal to the water pump 28, switches on the water pump 28 and adjusting water-pumping speed to make the water or detergent solution in the liquid dispensing container 25 flow out to the nozzle head 26 through the forked pipe 27 and form tiny liquid droplets being radially sprayed to the roller brush 22 such that the sprayed liquid falls on the roller brush 22 as evenly as possible. The rotating roller brush 22 drives the water or detergent solution to fall on the solar panel 200 while the roller brush 22 is used to clean the solar panel 200, which can effectively enhance the decontamination effect. When there is no enough remaining liquid in the liquid dispensing container 25 or the electric power of the electric power system is insufficient, or when cleaning work is finished, the control system 4 transmits a stop-pumping control signal to the water pump 28 to switch off the water pump 28. A method for determining remaining liquid in the liquid dispensing container 25 and a method for determining remaining electric power of the electric power system 5 will be described in detail below.

In the present invention, the technical effect of the cleaning device 2 lies in that the cleaning work to the solar panel 200 can be finished during the moving of the cleaning robot 100. If necessary, water or detergent solution can be sprayed on the solar panel 200 to be treated to better remove stubborn stains. The cleaning device 2 has fast cleaning speed and excellent effect, which can reduce labor cost effectively without manual monitoring or assistance.

Because the cleaning robot provided by the present invention is applied to the sloping plane like the solar panel, if the liquid dispensing container in the cleaning device can utilize a general cylindrical water tank or cuboid water tank, no matter how the drainage outlet is disposed, there is no guarantee for the drainage outlet to be at the lower point of the container. Under some angles, when liquid in the liquid dispensing container becomes less, the liquid level may be lower than the drainage outlet such that part of the liquid cannot be discharged smoothly. Because some solar panels are set in high places, replenishing the cleaning robot with liquid is troublesome. Therefore, liquid in the liquid dispensing container needs to be discharged out as completely as possible for full use. Thus, a designing a special shape for the liquid dispensing container 25 is required to ensure that the liquid in the container can be adequately extracted regardless of the direction the robot moving toward (uphill, downhill or horizontally moving).

With reference to FIGS. 5 to 10, the present invention provides a liquid dispensing container 25 (abbreviated as "container") configured to dispense liquid on a sloping plane. During the moving of the solar panel cleaning robot on the solar panel, the liquid dispensing container 25 in the robot body can dispense liquid. The liquid dispensing a body of the container 25 is a well-sealed container and mainly includes a column-shaped portion 252 and a taper portion 253 connected to each other. A bottom portion of the taper portion 253 is upside down below the column-shaped portion 252. A bottom surface of the taper portion 253 connected to a lower bottom surface of the column-shaped portion 252. A drainage outlet 251 is disposed on a top point at the lowest portion (cone tip) of the taper portion 253.

Figure 7:
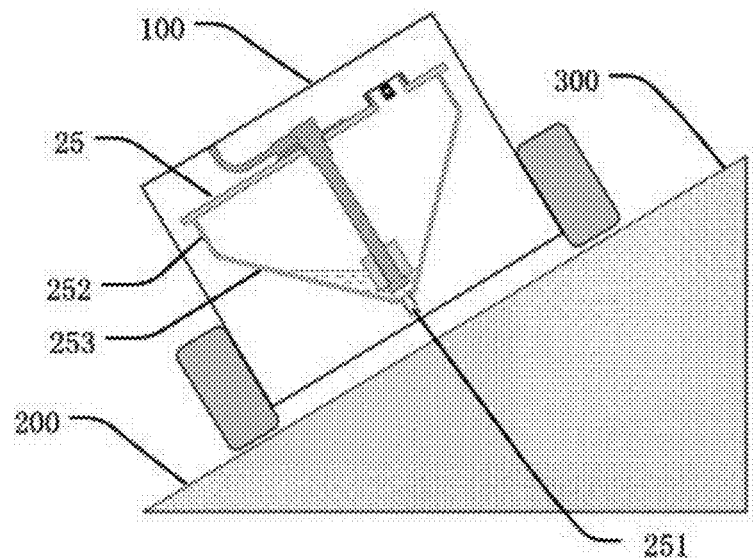
FIG. 7 is a working status structure schematic view of the liquid dispensing container of the embodiment 1 of the present invention on a slope.

With reference to FIG. 7, to make liquid in the liquid dispensing container 25 to be fully extracted out, when the liquid dispensing container 25 move toward any direction on the sloping plane 300, the drainage outlet 251 should be ensured to be always at the lowest point of the liquid dispensing container 25. Therefore, an included angle between a side surface of the taper portion 253 and the bottom surface of the taper portion 253 is greater than or equal to an included angle between the sloping plane 300 and a level surface. In the present invention, the solar panel 200 is the sloping plane 300. To ensure that when the liquid dispensing container 25 moves toward any direction on the solar panel 200, the drainage outlet 251 is always at the lowest point of the liquid dispensing container 2, the included angle between the side surface of the taper portion 253 and the bottom surface of the taper portion 253 is greater than or equal to the included angle between the solar panel 200 and the level surface, i.e. the tilt angle of the solar panel 200. Because the tilt angle of the solar panel 200 is generally from 10 to 40 degrees, a range of the included angle between the side surface of the taper portion and the bottom surface of the taper portion is generally from 15 to 45 degrees. Because the greater the included angle between the side surface of the taper portion and the bottom surface of the taper portion is, the smaller the entire volume of the liquid dispensing container 25 is, therefore a taper portion with a suitable shape can be selected based on the tilt angle of the solar panel 200, preferably from 25 to 35 degrees.

With reference to FIG. 7, the liquid dispensing container 25 is securely disposed in the robot body of the cleaning robot 100. A central axis of the liquid dispensing container 25 is perpendicular to a bottom surface of the robot body of the cleaning robot 100. All portions of the taper portion 253 except the drainage outlet 251 are all higher than a level surface on which a center of the drainage outlet 251 is located to ensure that the drainage outlet 251 is always at the lowest point of the liquid dispensing container 25.

Figure 8:
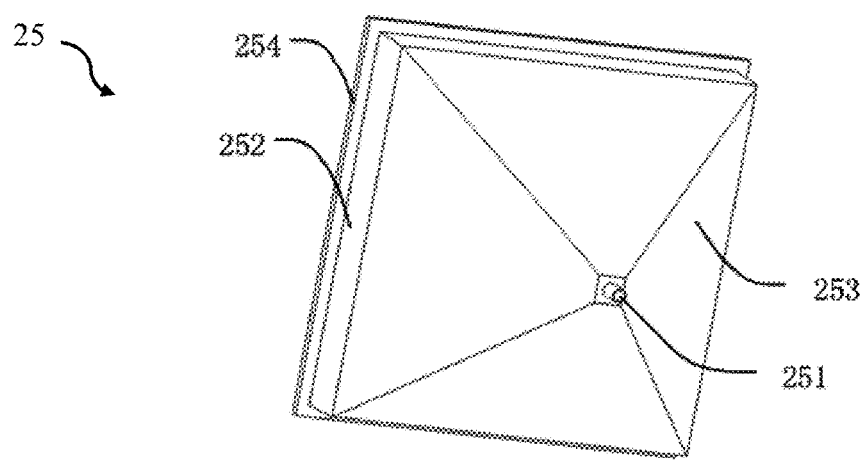
FIG. 8 is a structure schematic view of the liquid dispensing container of the embodiment 1 of the present invention.
Figure 9:
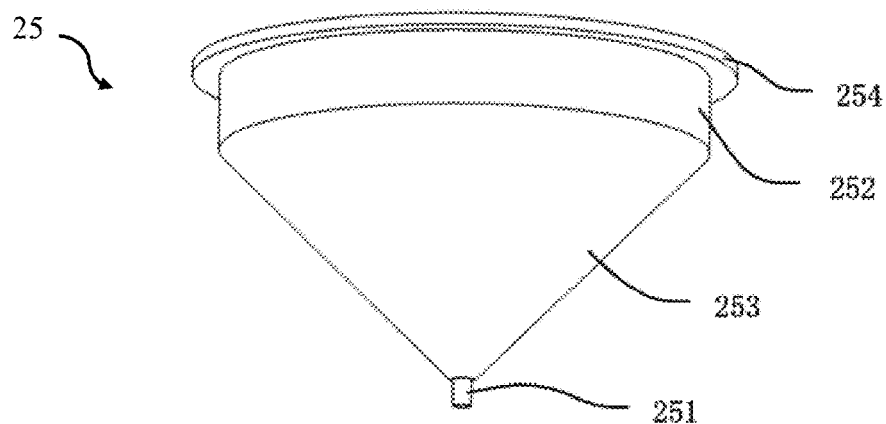
FIG. 9 is another structure schematic view of the liquid dispensing container of the embodiment 1 of the present invention.

The present invention provides two solutions, one solution is as follows: With reference to FIG. 8, the column-shaped portion 252 is a prism, and the taper portion 253 is a pyramid. A pyramid-bottom-surface of the pyramid is a lower bottom surface of the prism. The present invention preferably has the prism being a rectangular prism, and the pyramid is also a rectangular pyramid. Similarly, of the prism is triangular prism, and the pyramid is also a triangular pyramid. The other solution is as follows: With reference to FIG. 9, the column-shaped portion 252 is cylinder, and the taper portion 253 is a cone. A bottom surface of the cone is a lower bottom surface of the cylinder. When the space occupied by the liquid dispensing container 25 is fixed, the capacity of the container should be increased as much as possible.

Figure 10:
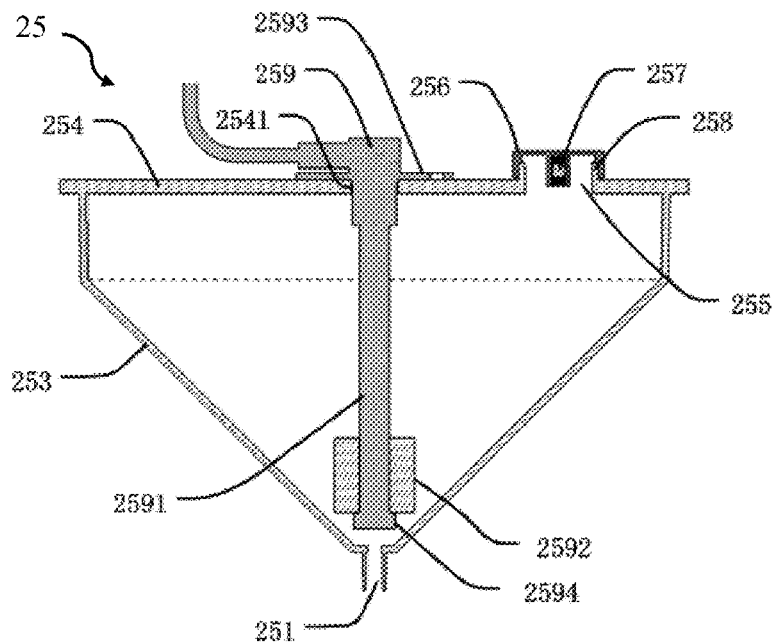
FIG. 10 is a cross sectional structure schematic view of the liquid dispensing container of the embodiment 1 of the present invention.

As shown in FIG. 10, the present invention the liquid dispensing container 25, further includes a container cover 254, a fill inlet 255, a fill inlet lid 256 and a bidirectional pressure relief valve 257.

The container cover 254 is securely installed on the upper bottom surface of the column-shaped portion 252. The fill inlet 255 is disposed on the container cover 254 and extends through the container cover 254. The fill inlet lid 256 is detachably installed on the fill inlet 255 and is configured to seal the fill inlet 255. The bidirectional pressure relief valve 257 is installed through the fill inlet lid 256 and is configured to make an internal and an external of the liquid dispensing container 25 to communicate with each other such that pressures inside and outside the container 25 are balanced to allow liquid to be smoothly discharged out from the container 25.

In the present invention, a horizontal cross section of the fill inlet 255 is circular. An annular lid opening 258 is disposed on a periphery of the fill inlet 255 and is perpendicular to the container cover 254. A first thread (not shown in the figures) is disposed on an outer side surface of the annular lid opening 258. The fill inlet lid 256 is cylindrical, and a size thereof matches the fill inlet 255. A second thread (not shown in the figures) is disposed on an inner sidewall of the fill inlet lid 256. The second thread is screwed on the first thread. By engagement of the first thread and the second thread, the fill inlet lid 256 and the fill inlet 255 are detachably connected.

Liquid (water or detergent solution) stored in the liquid dispensing container 25 is consumable and needs to be supplemented regularly. After all the liquid in the container has been consumed completely, the liquid dispensing container 25 can be filled with liquid (water or detergent solution) just by unscrewing the fill inlet lid 256. A connection place of the fill inlet lid 256 and the fill inlet 255 can be further sealed by sealing liquid or a sealing element. The container cover 254 and the column-shaped portion 252 may be designed integrally as one-piece or may be designed separately, as long as the connection place between the container cover 254 and the column-shaped portion 252 and the connection portion between the filling inlet lid 256 and the filler inlet 255 are sealed well.

Figure 11:
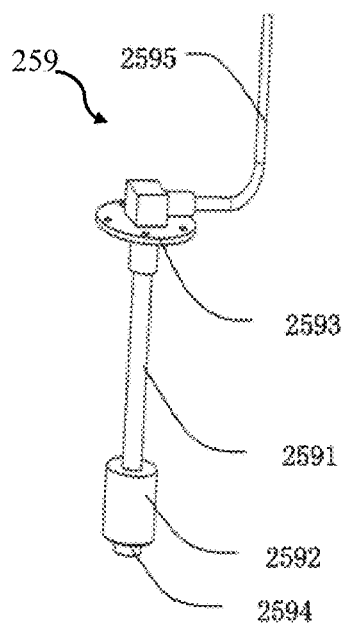
FIG. 11 is a structure schematic view of the liquid level sensor of the embodiment 1 of the present invention.

With reference to FIGS. 10 and 11, a liquid level sensor 259 is disposed in the liquid dispensing container 25 and is configured to acquire liquid level in the liquid dispensing container 25 in real-time. The liquid level sensor 259 is a part of the control system 4. In the present invention, the liquid level sensor 259 includes a longitudinal rod 2591 and a float sensor 2592 disposed around the longitudinal rod 2591. The float sensor 2592 floats on a liquid surface in the liquid dispensing container 25, and rises and falls along the longitudinal rod 2591 according to ascent and descent of the liquid level. The longitudinal rod 2591 is located at an axis of the maximum height in the liquid dispensing container 25, and is above the central axis of the liquid dispensing container 25 such that the float sensor 2592 acquires comprehensively precise liquid levels as much as possible. A connection slot hole 2541 is disposed at a center of the container cover 254. The longitudinal rod 2591 extends through the connection slot hole 2541 and is perpendicular to the container cover 254. A disc-shaped connector 2593 is disposed on an upper end of the longitudinal rod 2591 and is securely connected to the connection slot hole 2541. A lower end of the longitudinal rod 2591 is disposed on a portion of the taper portion 253 near the drainage outlet 251. A protruding annular block 2594 is disposed on the lower end of the longitudinal rod 2591 and configured to prevent the float sensor from falling out from the longitudinal rod 2591. The float sensor is connected to other parts of the control system 4 through at least one wire 2595 extending through an internal of the longitudinal rod 2591. During work of the cleaning device, the control system 4 can transmit at least one water pump 28 control signal to the water pump 28 according to real-time liquid level data in the liquid dispensing container 25 to start or stop the operation of the water pump 28, or to control discharging speed of liquid.

In the present invention, the technical effect of the liquid dispensing container 25 is that the drainage outlet 251 is always at the lowest point of the entire container 25 regardless of the direction that the robot body 1 (or the liquid dispensing container 25) moves toward on the sloping plane 300 such that liquid stored in the container 25 may be completely discharged out for full use without liquid leakage or failure of the drainage outlet 251 discharging liquid.

In the present invention, the liquid dispensing container 25 is a sealing container as a whole, and only the drainage outlet 251 on the lowest point can discharge liquid. If the container does not have any other vent hole, under effect of atmosphere, it is difficult for liquid to discharge out of the drainage outlet 251. If the fill inlet 255 of the container maintains opened status, once the water pump 28 is opened, liquid in the container continuously flows out in acceleration, controlling the flow rate is difficult, and the liquid will therefore evaporate from the fill inlet 255. For this reason, the present invention utilizes the technical solution disposing the bidirectional pressure relief valve 257 on the fill inlet lid 256, and the pressure relief valve can be opened or closed according to variation of pressure above the liquid surface of the liquid dispensing container 25.

Figure 12:
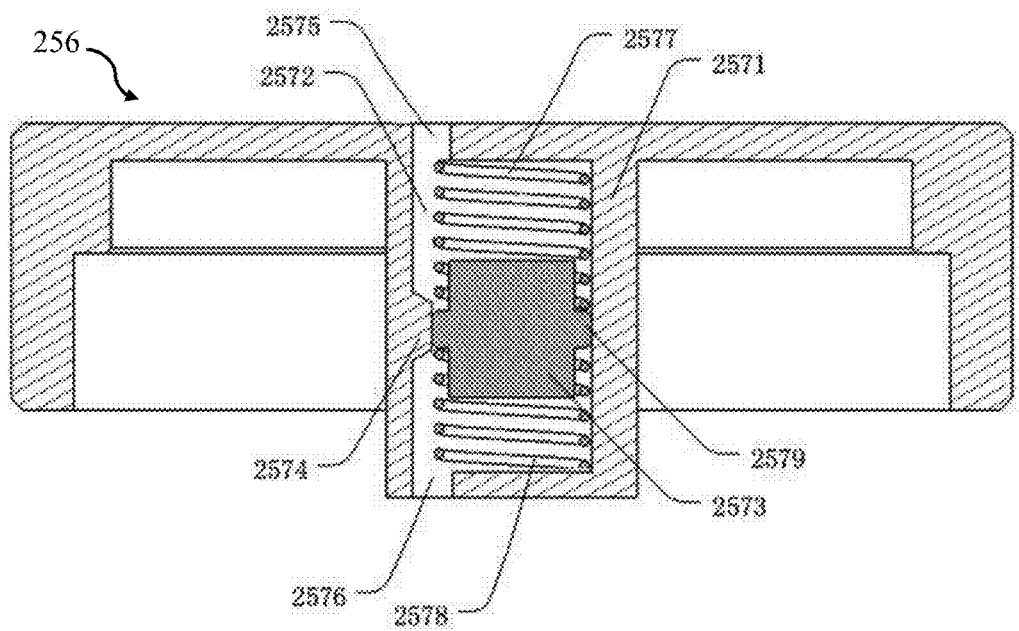
FIG. 12 is a cross sectional structure schematic view of a fill inlet lid of the embodiment 1 of the present invention.
Figure 13:
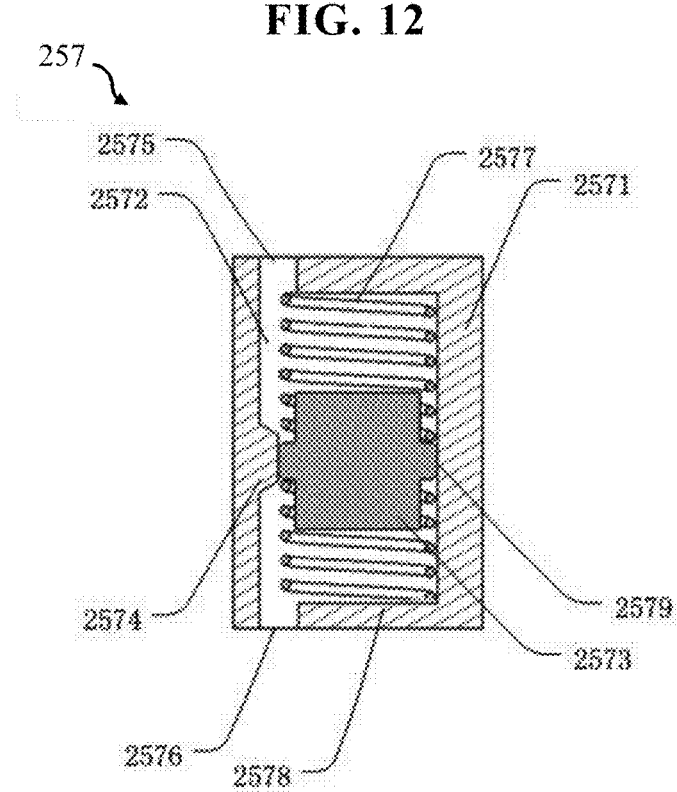
FIG. 13 is a cross sectional structure schematic view of a bidirectional pressure relief valve of the embodiment 1 of the present invention.

With reference to FIGS. 12 and 13, the bidirectional pressure relief valve 257 is installed through the fill inlet lid 256 and is configured to selectively communicate with an internal or an external of the liquid dispensing container 25. The bidirectional pressure relief valve 257 includes a hollow valve body 2571. A valve chamber 2572 is disposed in the valve body 2571. A sealing valve block 2573 and a sealing stopper 2574 are disposed in the valve chamber 2572.

The valve body 2571 is designed into an integral cylinder, and the valve chamber 2572 thereof is also a cylinder sealing cavity. A first vent hole 2575 is disposed on a top portion of the valve body 2571 and makes the valve chamber 2572 communicate with the external of the container 25. A second vent hole 2576 is disposed on a bottom surface of the valve body 2571 to make the valve chamber 2572 communicate with the internal of the container 25. The top portion of the valve body 2571 of the bidirectional pressure relief valve 257 is sealably connected to the fill inlet lid 256. In the present invention, the valve body 2571 and the fill inlet lid 256 may be formed integrally to one-piece to reduce manufacturing processes of parts such as disposing sealing liquid or sealing elements.

The present invention may also include a first resilient element 2577 and a second resilient element 2578. An upper end of the first resilient element 2577 is securely disposed on a top portion of the valve chamber 2572, and a lower end of the first resilient element 2577 is connected to the sealing valve block 2573. An upper end of the second resilient element 2578 is connected to the sealing valve block 2573 and a lower end of the second resilient element 2578 is securely disposed on a bottom portion of the valve chamber 2572. The sealing valve block 2573 is slidably installed in the valve chamber 2572. The sealing stopper 2574 protrudes from a middle portion of a sidewall of the valve chamber 2572. An inner sidewall of the valve chamber 2572 is a smooth sidewall. Under collective effect of the first resilient element 2577 and the second resilient element 2578, the sealing valve block 2573 can slide upward or downward. In the valve chamber 2572, the pressure above the sealing valve block 2573 is the atmospheric pressure, and the pressure below the sealing valve block 2573 is the pressure above the liquid surface of the container 25.

Specifically, the sealing valve block 2573 may include an upper section, a middle section, and a lower section, each of them is cylindrical. The sealing valve block 2573 includes an annular shoulder portion 2579 protruding from a middle portion of a sidewall of the sealing valve block 2573. The annular shoulder portion 2579 is the middle section, and the upper section and the lower section are in the same size. A diameter of a bottom surface of the annular shoulder portion 2579 (middle section) is greater than each of diameters of bottom surfaces of the upper section and the lower section. An outer sidewall of the annular shoulder portion 2579 is disposed tangentially to an outer sidewall of the sealing stopper 2574 and the inner sidewall of the valve chamber 2572. An upper portion (upper section) of the annular shoulder portion 2579 is connected to the first resilient element 2577. A lower portion (lower section) of the annular shoulder portion 2579 is connected to the second resilient element 2578. The first resilient element 2577 and the second resilient element 2578 of the present invention are preferably springs, and may choose other resilient elements.

When the water pump 28 is under stop status, the pressure above the liquid surface of the liquid dispensing container 25 is the same as the ambient atmospheric pressure. The first resilient element 2577 and the second resilient element 2578 do not deform or deforms less, the sealing valve block 2573 is in a force balance and in a relatively static status, a sidewall of a widest portion (annular shoulder portion) of the sealing valve block 2573 is disposed tangentially to a sidewall of the sealing stopper 2574 and the inner sidewall of the valve chamber 2572. The sealing valve block 2573 and sealing stopper 2574 fill a middle portion of the valve chamber 2572. An upper portion of the valve chamber 2572 is separated hermetically from a lower portion of the valve chamber 2572 without communication.

If the cleaning robot 100 is under operating status, the cleaning device 2 works normally, the water pump 28 extracts liquid, the pressure above the liquid surface in the liquid dispensing container 25 becomes smaller, the pressure in the liquid dispensing container 25 is less than the ambient atmospheric pressure, and a pressure difference is generated between an upper surface and a bottom surface of the sealing valve block 2573. The atmospheric pressure overcomes resilient force of the first resilient element 2577 and the second resilient element 2578 and gravity of the sealing valve block 2573 to make the sealing valve block 2573 slide downward. The annular shoulder portion 2579 is separated from the sealing stopper 2574, and an air passageway is formed between the annular shoulder portion 2579 and the inner sidewall of the valve chamber 2572. Under the effect of the pressure difference, ambient air enters the liquid dispensing container 25 through the air passageway. When the pressure above the liquid surface in the liquid dispensing container 25 and the ambient atmospheric pressure (pressure difference is zero) are equal or about equal (pressure difference is little), and the pressures inside and outside the liquid dispensing container 25 reach a new balance. Under effect of resilient force of the first resilient element 2577 and the second resilient element 2578, the sealing valve block 2573 slides upward progressively to further implement restoration, the sidewall of the annular shoulder portion 2579 is disposed tangentially to the sidewall of the sealing stopper 2574 and the inner sidewall of the valve chamber 2572 again, and the air passageway is closed. During operation of the cleaning device, the water pump 28 continuously extracts liquid, and the above process will be repeated. When the cleaning device stops working, or when the liquid surface in the liquid dispensing container 25 is lowered to a specific threshold value, or when remaining electric power of the electric power system 5 declines to a specific threshold value, the water pump 28 is switched off by the control system 4 and stops extracting liquid.

If the cleaning robot 100 is under stop status, the cleaning device 2 stops working, because the cleaning robot 100 is placed on the solar panel and is continuously exposed under direct sunlight in a long time, the temperature of liquid and air in the liquid dispensing container 25 may raise. Because of thermal expansion and contraction of the physical phenomenon, the pressure in the liquid dispensing container 25 would be greater than the ambient atmospheric pressure, and a pressure difference is generated between the upper surface and the bottom surface of the sealing valve block 2573 such that the sealing valve block 2573 slides upward. The annular shoulder portion 2579 and sealing stopper 2574 are separated, and an air passageway is formed between the annular shoulder portion 2579 and the inner sidewall of the valve chamber 2572. Under the effect of the pressure difference, ambient air enters the liquid dispensing container 25 through the air passageway. When the pressure above the liquid surface in the liquid dispensing container 25 and the ambient atmospheric pressure (pressure difference is zero) are equal or approximately equal (pressure difference is little), and the pressures inside and outside the liquid dispensing container 25 reach a new balance. Under effect of resilient force of the first resilient element 2577 and the second resilient element 2578, the sealing valve block 2573 slides downward progressively to further implement restoration. The sidewall of the annular shoulder portion 2579 is disposed tangentially to the sidewall of the sealing stopper 2574 and the inner sidewall of the valve chamber 2572 again, and the air passageway is closed. When the cleaning robot is under static status, the liquid dispensing container 25 is exposed under sunlight in a long time, the above process may be repeated to timely release the pressure in the container 25 to prevent safety accidents.

In the present invention, the technical effect of the bidirectional pressure relief valve 257 is that the pressures inside and outside the liquid dispensing container 25 are ensured to be maintained in a balance as much as possible such that the water pump 28 can extract liquid from the liquid dispensing container 25 or timely release the pressure in the container 25 to prevent safety accidents.

The left-front wheel 31 is installed on a left side of a front portion of a bottom surface of the robot body, and includes a left-front wheel hub 311 and a left-front wheel axis 312. The left-front wheel axis 312 is disposed on a center of the left-front wheel hub 311. The right-front wheel 32 is installed on a right side of the front portion of the bottom surface of the robot body, and includes a right-front wheel hub 321 and a right-front wheel axis 322. The right-front wheel axis 322 is disposed on a center of the right-front wheel hub 321. The left-rear wheel 33 is installed on a left side of a rear portion of the bottom surface of the robot body, and includes a left-rear wheel hub 331 and a left-rear wheel axis 332 (not shown in the figures). The left-rear wheel hub 331 is disposed on a same straight line with the left-front wheel hub 311, and the left-rear wheel axis is disposed on a center of the left-rear wheel hub 331. The right-rear wheel 34 is installed on a right side of the rear portion of the bottom surface of the robot body, and includes a right-rear wheel hub 341 and a right-rear wheel axis (not shown in the figures). The right-rear wheel hub 341 is disposed on a same straight line with the right-front wheel hub 321. The right-rear wheel axis is disposed on a center of the right-rear wheel hub 341. The right-rear wheel axis is directly connected to or connected through a transmission device (not shown in the figures) to the left-rear wheel axis. The left-drive motor 35, the right-drive motor 36 is securely connected to the robot body 1 through a fastening device, is connected to the electric power system 5 through at least one wire, and is connected to the control system 4 through at least one signal line. The left-drive motor 35 is directly connected to or connected through a transmission device (not shown in the figures) to the left-front wheel axis 312. The right-drive motor 36 is directly connected to or connected through a transmission device (not shown in the figures) to the right-front wheel axis 322. Each of the two tracks 37 is a flexible link loop, one of the tracks 37 covers an outer portion of an annular sidewall of the left-front wheel hub 311 and an outer portion of an annular sidewall of the left-rear wheel hub 331; the other the track 37 covers an outer portion of an annular sidewall of the right-front wheel hub 321 and an outer portion of an annular sidewall of the right-rear wheel hub 341. A track housing 371 is disposed on an external of each the track 37 to protect the track and the hub and prevent debris from entering the track or the hub and affecting the normal moving of the robot body 1.

In the present invention, the control system 4 according to a pre-planned optimized path transmits at least one moving control signal to the left-drive motor 35, the right-drive motor 36 such that the left-drive motor 35 and the right-drive motor 36 synchronously adjust rotating speeds and rotational directions of the left-front wheel 31 and the right-front wheel 32 to further adjust the moving direction and moving speed of the robot body 1, which allows the robot body to implement actions such as straight moving, deflection correction, 90 degrees turn, U-turn.

When the robot body is required to move straight forward, the control system 4 simultaneously transmits a linearly-moving control instruction to the left-drive motor 35 and the right-drive motor 36. The control instruction includes the same motor-rotating speed (for example, rotating speeds of the left-drive motor and right-drive motor are both 60 RPM) and the same rotating direction (for example, the left-drive motor is rotated clockwise, and the right-drive motor is rotated counterclockwise) for the drive motor shaft. Therefore, the left-front wheel 31 and the right-front wheel 32 are driven to synchronously rotate forward. The left-rear wheel 33 and the right-rear wheel 34 are driven wheels, and are driven by the track 37 to synchronously rotate forward with the left-front wheel 31 and the right-front wheel 32 such that the entire robot body 1 moves forward.

When the robot body 1 is required to implement a right deflection, the control system 4 simultaneously transmits a deflection-correction-moving control instruction to the left-drive motor 35 and the right-drive motor 36, and the motor-rotating speed in the control instruction received by the left-drive motor 35 is greater than the motor-rotating speed in the control instruction received by the right-drive motor 36. The difference of the rotating speeds depends on a deflection angle to be adjusted, the less the deflection angle is, the less the rotating speed is. Similarly, when the robot body 1 is required to implement left deflection, the motor-rotating speed in the control instruction received by the left-drive motor 35 is less than the motor-rotating speed in the control instruction received by the right-drive motor 36. When the robot body 1 is back to the original predetermined moving direction, the control system 4 transmits a linearly-moving control instruction again, the rotating speeds of the left-drive motor 35, the right-drive motor 36 become the same once again such that the robot body 1 keeps moving straight forward.

When the robot body is required to implement 90 degrees turn, the control system 4 calculates the rotating speeds and rotating directions of the left-drive motor 35 and the right-drive motor 36 according to a predetermined turning radius. If the turning radius is greater, the rotating directions of the drive motors may be opposite (one is clockwise, the other is counterclockwise), the left-front wheel 31 and the right-front wheel 32 synchronously rotate forward, or one of the wheels is set to stop rotating, to achieve an effect of turn during the moving; If the turning radius is less or on-the-spot turn is performed, the rotating directions of the left-drive motor 35 and the right-drive motor 36 may be designed as the same, both are clockwise or both are counterclockwise. Thus, one of the left-front wheel 31 and the right-front wheel 32 rotates forward, the other rotates backward, one side of the robot body 1 moves forward, and the other side move backward such that small radius turn or on-the-spot turn is performed.

When the robot body is required to implement U-turn (also called "back turn"), the robot body is requested to move to a car lane adjacent to an original car lane after 180 degrees turn. In such case, technical solutions are one-time U-turn and phased U-turn. The control system 4 calculates the rotating speeds and rotating directions of the left-drive motor 35 and the right-drive motor 36 according to the predetermined turning radius. In the solution of one-time U-turn, the turning radius is half a width of the robot body, the front wheel on the inside during the turn stops rotating or rotates forward with an extreme speed (if left U-turn is implemented, the left-front wheel stops rotating; if right U-turn is implemented, the right-front wheel stops rotating), the front wheel on the outside during the turn fast rotates forward to implement left or right U-turn. In the solution of phased U-turn, different solutions may be calculated out according to specific circumstances. The present invention preferably has the following solution: first the robot body 1 is controlled to implement a left on-the-spot turn or right on-the-spot turn of 90 degrees, then the robot body is controlled to move forward for a distance being a width of the body member, and finally the robot body is controlled to implement a left on-the-spot turn or right on-the-spot turn of 90 degrees. Thus, left or right U-turn may be achieved, and the robot body right moves in a car lane adjacent to a former car lane after the U-turn such that the space of the robot of the present invention can achieve non-repeating and dead-space-free effect.

The power system 3 further includes at least one hub gear 38 evenly disposed on surfaces of the outer portions of the annular sidewalls of the left-front wheel hub 311, the left-rear wheel hub 331, the right-front wheel hub 321 and the right-rear wheel hub 341; and at least one track inner tooth 372, evenly disposed on a surface of an inner sidewall of each track 37, the track inner tooth 372 engaged with the hub gear 38 to ensure that when the two front wheels 31, 32 rotate, the track 37 can cooperate with the two hubs to work normally.

Because the solar panel is comparatively smooth with a certain tilt degree, cleaning robot the robot body easily falls off when moving. To solve such issue, with reference to FIG. 6, the power system 3 further includes at least one skid-proof block 373 protruding from an outer sidewall of each the track 37, the skid-proof blocks 373 may be arranged in an ordered array, and are distributed on the entire track 37. The robot body 1 of the present invention utilizes a track structure, and attaches the skid-proof block 373 on the outer sidewall of the track for increasing the friction coefficient, enhancing gripping force, and preventing the robot body 1 from falling off during the moving. Similarly, the track 37 of the present invention may also dispose at least one skid-proof pattern (not shown in the figures) recessed in the outer sidewall of each track and evenly distributed on the entire track, and the effect thereof is the same as that of the skid-proof block.

In the present invention, the technical effect of the power system 3 lies in that utilizing the structures of the track and the skid-proof block allows the robot body of the cleaning robot to be able to freely move on the solar panel without falling off. The left and right-front wheels are driven respectively with two motors to precisely control the moving status of the robot body such that the robot body can more flexibly adjust the moving direction and implement an on-the-spot turn. Therefore, a coverage of the moving path can increase as greater as possible.

Figure 14:
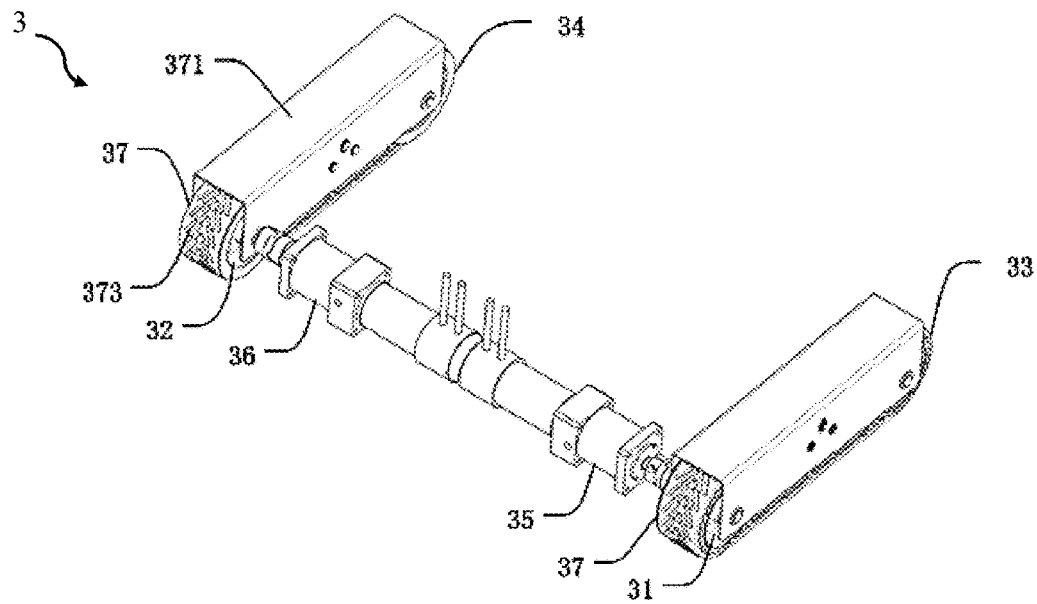
FIG. 14 is an overall structure schematic view of the power system of the embodiment 1 of the present invention.
Figure 15:
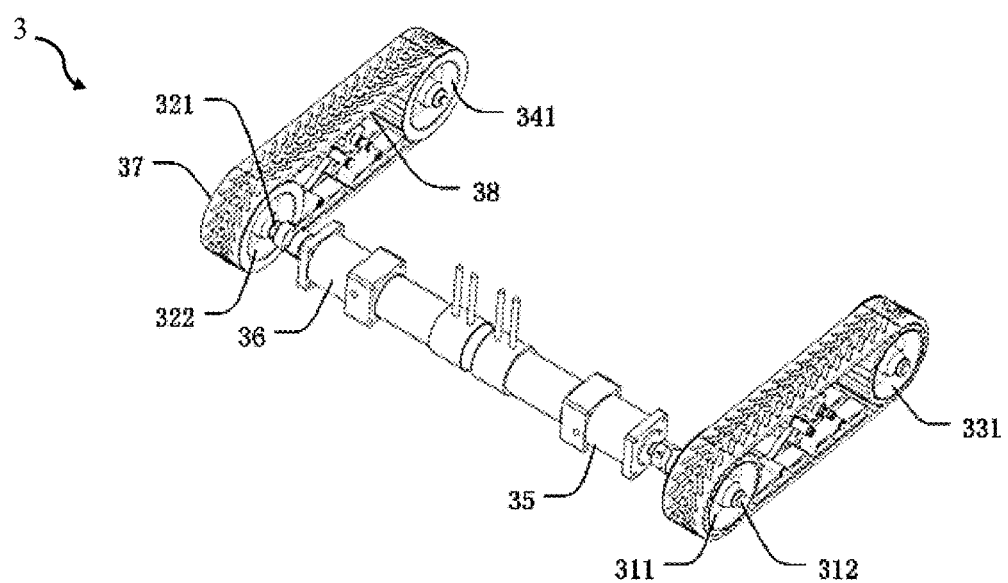
FIG. 15 is a structure schematic view of the power system of the embodiment 1 of the present invention with removal of the track housing.

With reference to FIGS. 14 and 15, the power system 3 further includes two track tension devices 39, and the track tension devices 39 are disposed respectively in the tracks 37. After installed, the track has a certain looseness degree, and therefore tension adjustment should be implemented to the flexible link loop to ensure the track can normally move forward. The prior art is mounting an induction wheel in front of the track, and the induction wheel is equipped with a separation mechanism and two worms. By adjusting the separation mechanism and the worms, tensioning is achieved. The way and structure of such adjustment is more complicated and the adjustment can only be one-time implemented instead of being implemented in real-time during the operation of the track.

Figure 16:
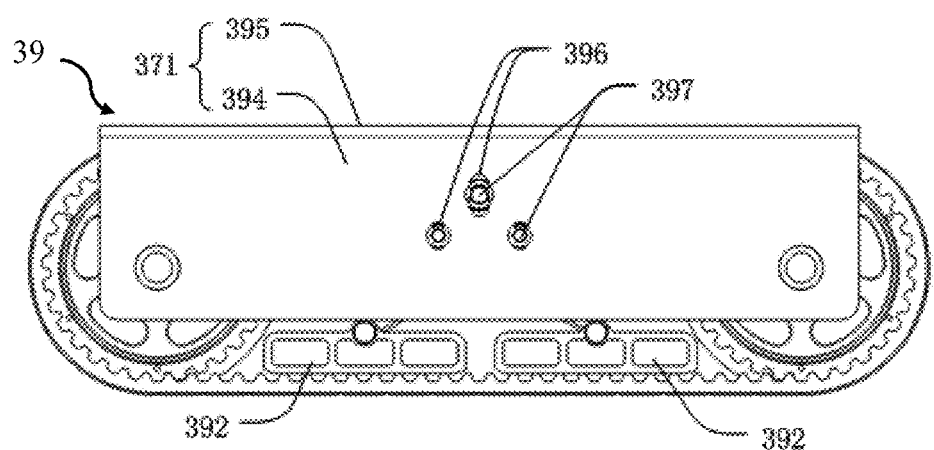
FIG. 16 is a structure schematic view of the first embodiment of the track tension device of the embodiment 1 of the present invention.
Figure 17:
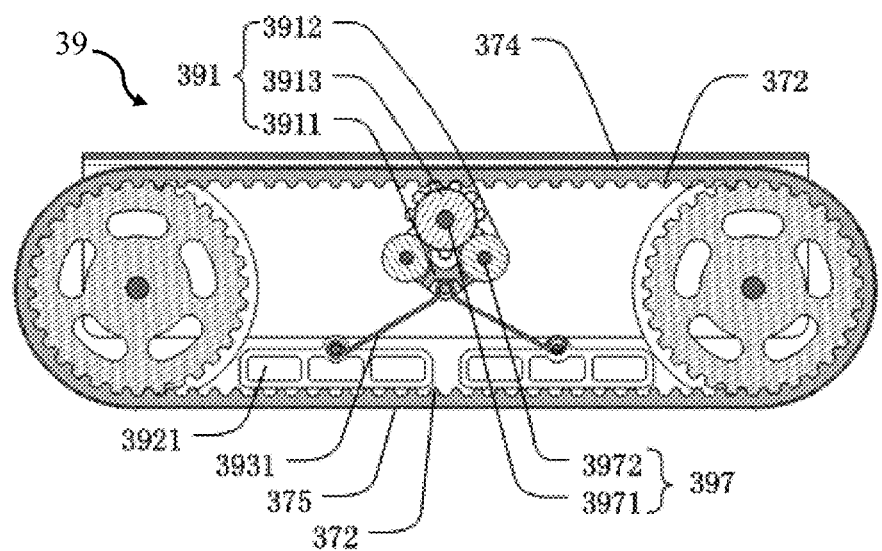
FIG. 17 is a structure schematic view of the first embodiment of the track tension device of the embodiment 1 of the present invention with removal of the track side plate.
Figure 18:
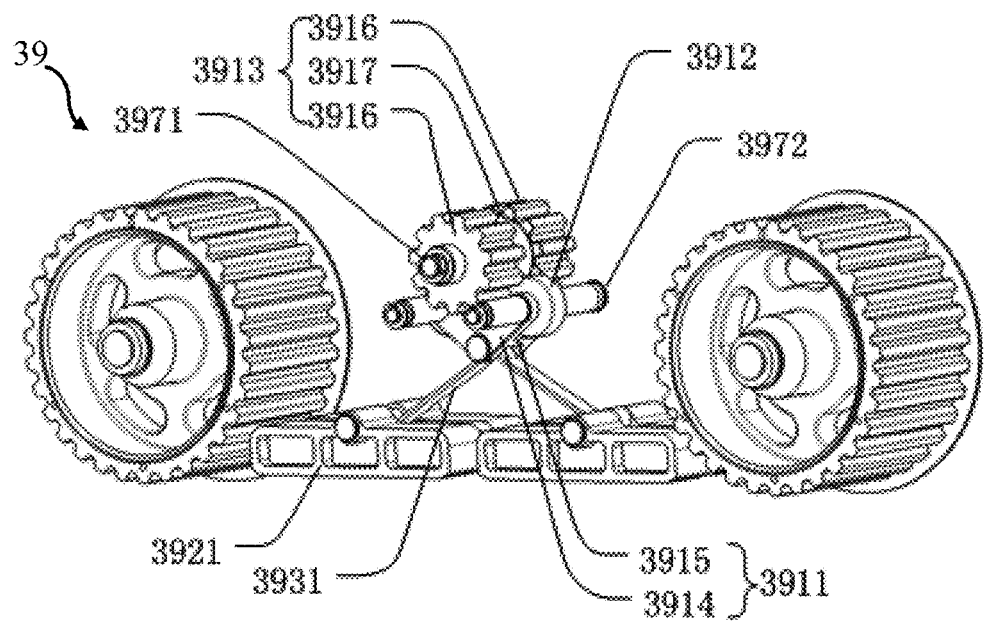
FIG. 18 is a structure schematic view of the first embodiment of the track tension device of the embodiment 1 of the present invention with removal of the track.

The present embodiment provides the following three track tension devices. With reference to FIGS. 16 to 18, the first embodiment the track tension device 39 includes an upper tension portion 391, a lower compression portion 392 and a resilient support portion 393.

The track 37 is a flexible link loop having the track inner teeth 372 evenly disposed on the inner sidewall of each track 37. The track 37 includes an upper transmission belt 374, a lower transmission belt 375. The upper transmission belt 374 is an upper portion of the track 37, the lower transmission belt 375 is a lower portion of the track 37, at least one track inner tooth 372 is disposed on a lower surface of the upper transmission belt 374, and at least one track inner tooth 372 is disposed on an upper surface of the lower transmission belt 375.

The upper tension portion 391 has an upper end disposed tangentially to or engaged with the lower surface of the upper transmission belt 374, and is configured to tension the upper transmission belt 374. During the moving of the track, the upper tension portion 391 and the upper transmission belt 374 are slidably or rotatably connected to each other. The lower compression portion 392 has a lower end disposed tangentially to the upper surface of the lower transmission belt 375, and is configured to compress the lower transmission belt 375. The resilient support portion 393 has an end connected to the upper tension portion 391 and another end connected to the lower compression portion 392, and is configured to support the upper tension portion and the lower compression portion.

With reference to FIG. 16, the track tension device 39 may include two track side plates 394 disposed respectively on two sides of the track 37. The two track side plates 394 may be connected to each other through a track top plate 395 to form an integral track housing 371. The track housing 371 is securely connected to the wheel axis of the robot body 1 through at least one bolt. At least one perpendicular longitudinal slot 396 is disposed perpendicularly in an upper portion of each track side plate 394. The track tension device 39 further includes at least one installing shaft 397 having two ends up-and-down-slidably disposed respectively in opposite two longitudinal slots 396. The two longitudinal slots 396 are located respectively on the two track side plates 394. The installing shaft 397 and the parts assembled on the installing shaft 397 can move up and down in a range limited by the longitudinal slot 396. The track tension device 39 may only include one track side plate 394 disposed on one side of the track 37 of the robot. At least one longitudinal slot is perpendicularly disposed in the upper portion of the track side plate, and an end of the installing shaft 397 is up-and-down-slidably disposed in one longitudinal slot 396. The present invention preferably has a solution of disposing three longitudinal slots in one track side plate, the three longitudinal slots are arranged respectively in three vertices of a triangle.

The installing shaft 397 includes at least one gear installation shaft 3971 and at least one transmission-wheel installation shaft 3972. The gear installation shaft 3971 parallels the transmission-wheel installation shaft 3972. The gear installation shaft 3971 is located above a middle place between two transmission-wheel installation shafts 3972. The present invention preferably has one gear installation shaft 3971 and two transmission-wheel installation shafts 3972. The gear installation shaft 3971 and the two transmission-wheel installation shafts 3972 are arranged respectively in three vertices of a triangle. The upper tension portion 391 includes a V-shaped bracket 3911, at least one tension transmission wheel 3912 and at least one tension gear 3913. The present invention preferably has one tension gear 3913 and two tension transmission wheels 3912. The tension gear 3913 and the two tension transmission wheels 312 are arranged respectively in three vertices of a triangle.

Two transmission-wheel installation shafts 3972 are disposed respectively on two ends of an upper portion of the V-shaped bracket 3911. The V-shaped bracket 3911 includes two paralleling V-shaped planar plates 3914 and two crossbeams 3915. Two ends of each crossbeam 3915 are securely connected respectively to the two V-shaped planar plates 3914. The transmission-wheel installation shafts 3972 are perpendicularly to the V-shaped planar plates 3914. The gear installation shaft 3971 is disposed above the V-shaped bracket 3911, and faces a middle place of the transmission-wheel installation shafts 3972. A lower end of the V-shaped bracket 3911 is connected to the resilient support portion 393.

The tension transmission wheel 3912 is installed on the transmission-wheel installation shaft 3972 through a roller bearing (not shown in the figures). Each tension gear is installed on a gear installation shaft 3971 through a roller bearing (not shown in the figures), and an end of the tension gear is engaged with the lower surface of the upper transmission belt 374.

Two tension transmission wheels 3912 are disposed on lower portions of two sides of the tension gear 3913. The tension transmission wheels 3912 are disposed tangentially to or engaged with the tension gear 3913, and both of them can achieve transmission. The tension gear 3913 and the tension transmission wheels 3912 may have gear surfaces or non-gear surfaces. If gear surfaces are implemented, both of them are engaged with each other. If non-gear surfaces are implemented, both of them are disposed tangentially to each other.

In the present invention, the tension gear 3913 is a double straight tooth cylindrical gear, and specifically includes two cylindrical gears 3916 and a cylindrical linkage portion 3917. The two cylindrical gears 3916 are engaged with the lower surface of the upper transmission belt 374. The cylindrical linkage portion 3917 is disposed between the two cylindrical gears 3916. Diameters of the two cylindrical gears 3916 are the same. A diameter of the linkage portion 3917 is less than a diameter of the cylindrical gear 3916. Each tension transmission wheel 3912 is disposed tangentially to the linkage portion 3917 of the tension gear 3913.

The lower compression portion 392 is at least one tension compression plate 3921, and preferably two tension compression plates 3921 are disposed tangentially to the upper surface of the lower transmission belt 375. The resilient support portion 393 includes a reverse V-shaped resilient element 3931, an upper portion of the reverse V-shaped resilient element 3931 connected to a lower end of the upper tension portion 391, i.e. a corner of a lower end of the V-shaped bracket 3911. Two ends of a lower portion of the reverse V-shaped resilient element 3931 are connected respectively to two lower compression portions 392, i.e. tension compression plates 3921.

The corner of the lower end of the V-shaped bracket 3911 has a curved hole, a corner of the upper portion of the reverse V-shaped resilient element 3931 is a semicircular angle. The upper portion of the reverse V-shaped resilient element 3931 with the semicircular angle is assembled in the curved hole. Two ends of the lower portion of the reverse V-shaped resilient element 3931 are connected respectively two circular hooking rings, and the two circular hooking rings are connected respectively to the two lower compression portions 392, i.e. upper surfaces of the tension compression plates 3921. Specifically, a recess is disposed in each tension compression plate 3921, and a tension compression plate 3921 connection shaft is disposed in the recess. Each circular hooking ring is correspondingly connected to a connection shaft of the tension compression plate 3921.

During the operation of the track of the present invention, because the track 37 is a flexible link loop, the track inner tooth in the inner surface of the track is engaged with the sidewalls of the front and rear hubs. Meanwhile, the tension gear 3913 is also engage with the lower surface of the upper transmission belt 374. The track 37 rolling forward drives the tension gear 3913 to rotate.

The reverse V-shaped resilient element 3931 has a small open angle before the above parts are assembled. After assembly of the above parts, the reverse V-shaped resilient element is deformed and the open angle increases such that the track 37 is in tension, in which case the reverse V-shaped resilient element has a tendency to recover its original shape (smaller open angle).

When the track with the hubs moves forward and backward, the track 37 acts on the tension gear 3913 and drives the tension gear 3913 to rotate, that is, it is equivalent to the force applied by the track 3931, which generates a downward force and pushes the tension gear 3913 to move downward along the longitudinal slot 396. In the meantime, the tension transmission wheel 3912 and the tension gear 3913 are tangent and moved downward by the action of the tension gear 3913 to further compress the reverse V-shaped resilient element 3931. At this moment, the angle of the reverse V-shaped resilient element 3931 continues to increase, the deformation of the reverse V-shaped resilient element 3931 increases, and the resulting resilient force further increases.

When the track and the tension gear 3913 are separated from each other, or the tension gear 3913 is spaced apart from the transmission wheels, the reverse V-shaped resilient element 3931 releases a portion of the compressed elastic potential energy, the open angle becomes smaller, and the track 37 is tensioned again. According to the motion state of the track 37, the resilient support portion 393 can adjust the tension force in real-time, reducing the rigid friction between the parts and enhancing the service life of the parts.

Figure 19:
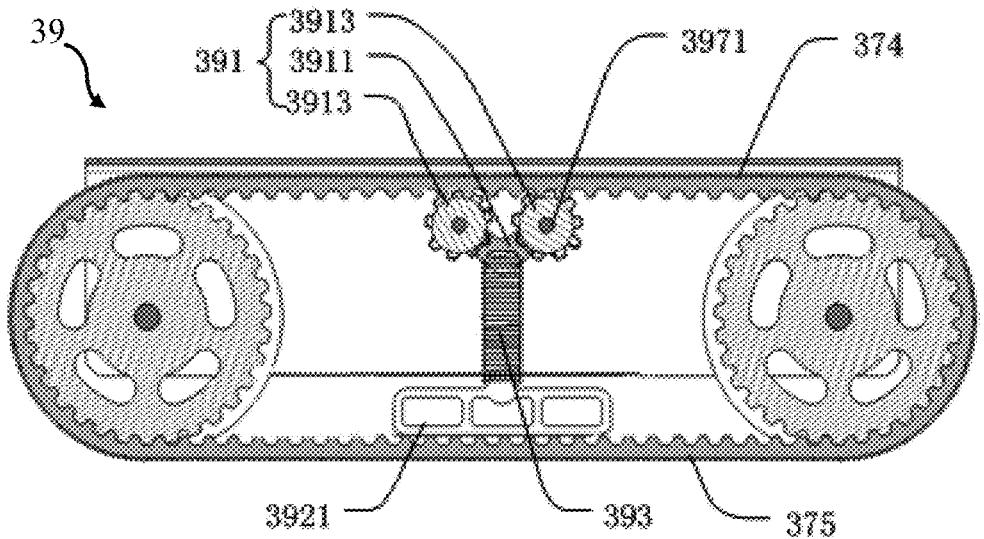
FIG. 19 is a structure schematic view of the second embodiment of the track tension device of the embodiment 1 of the present invention with removal of the track side plate.

With reference to FIG. 19, the present invention also provides a second embodiment of the track tension device, most of technical solutions thereof are the same as those of the first embodiment of the track device, and the different technical features are as follows. In the second embodiment of the track tension device, the installing shaft 397 only includes at least one gear installation shaft 3971, and does not include the transmission-wheel installation shaft 3972. Preferably, two gear installation shafts 3971 paralleling each other. The upper tension portion 391 includes a V-shaped bracket and at least one tension gear 3913, the present invention preferably includes two tension gears 3913, and the two tension gears 3913 are arranged in three vertices of a triangle. The two gear installation shafts 3971 are disposed respectively on two ends of an upper portion of the V-shaped bracket 3911. The gear installation shafts 3971 are perpendicular to the V-shaped planar plates 3914. The lower compression portion 392 is at least one tension compression plate 3921, and is disposed tangentially to the upper surface of the lower transmission belt 375. The resilient support portion 393 may be a spring set composed of one or more springs, and may be a rubber pad. An end of the resilient support portion 393 is connected to the lower end of the upper tension portion 391, i.e. the corner of the lower portion of the V-shaped bracket 3911, and another end of the resilient support portion 393 is connected to the lower compression portion 392, i.e. the tension compression plate 3921. The second embodiment of the track tension device is more structurally simpler with lower cost but has poorer tension effect, and therefore material requirement for the resilient support portion 393 is higher. Its working principle is similar to the first embodiment of the track tension device, and no further description is given here.

Figure 20:
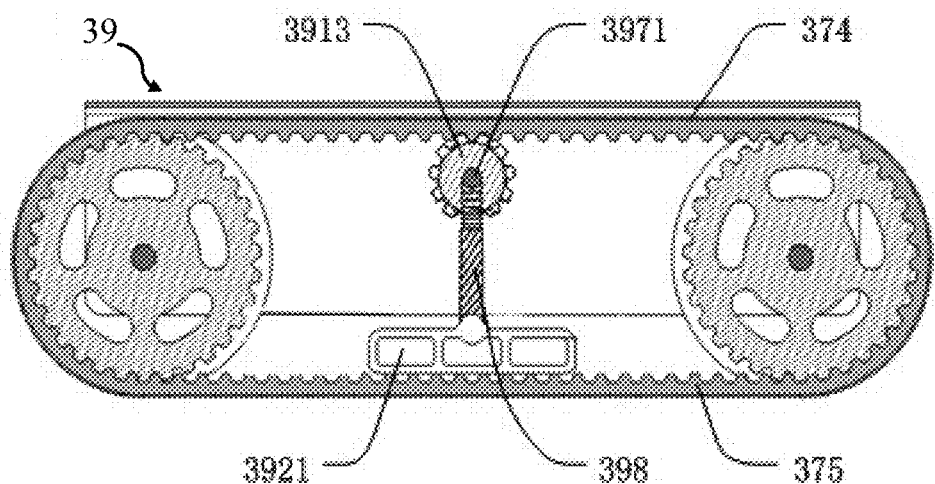
FIG. 20 is a structure schematic view of the third embodiment of the track tension device of the embodiment 1 of the present invention with removal of the track side plate.

With reference to FIG. 20, the present invention also provides a third embodiment of the track tension device, most of the technical solutions are the same as those of the second embodiment of the track device, the different technical feature is that the upper tension portion 391 includes at least one tension gear, preferably one tension gear 3913 is installed on a gear installation shaft 3971 through a roller bearing. The third embodiment of the track tension device further includes a gear bracket 398 substituted for the V-shaped bracket. The gear installation shaft 3971 is installed on an upper end of the gear bracket 398, and the resilient support portion 393 is connected to a lower end of the gear bracket 398. The lower compression portion 392 is at least one tension compression plate 3921. The resilient support portion 393 is a spring set composed of one or more springs, and may be a rubber pad. An end of the resilient support portion 393 is connected to the lower end of the gear bracket 398, and another end of the resilient support portion 393 is connected to the tension compression plate 3921. The third embodiment of the track tension device is more structurally simpler with lower cost but has poorer tension effect, and therefore material requirement for the resilient support portion 393 and gear bracket 398 is higher. Its working principle is similar to the second embodiment of the track tension device, and no further description is given here.

In the present invention, the technical effect of the track tension device is that a "sliding assembly design" is employed. In other words, a resilient support portion 393 is added between the upper tension portion 391 and the lower compression portion 392. Through the longitudinal slot, up-and-down floating of the tension device is achieved, tension force during moving of the track is adjusted in real-time. Such adjustment, according to the track operation to achieve flexible adjustment, can mitigate wear and tear of the parts of rigid adjustment, reduce the friction between parts and increase the service life of the track. The adjusted track can timely adapt to the road. The track moving device with the track tension device can achieve power-saving purposes. The track tension device is structurally simple and is easy to assemble.

Figure 21:
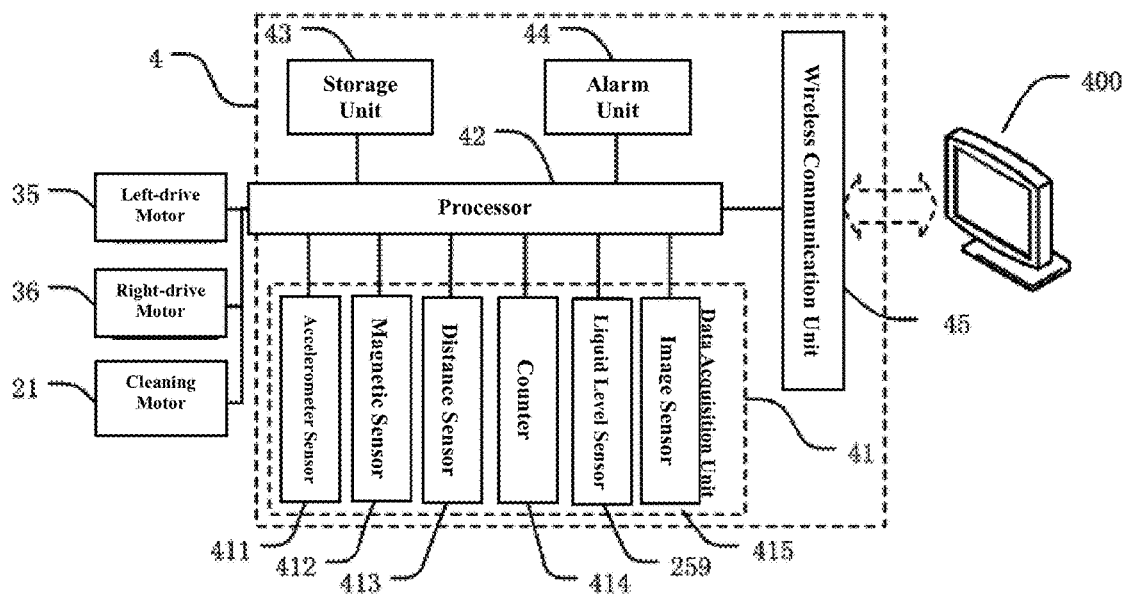
FIG. 21 is a structural block diagram of the control system of the embodiment 1 of the present invention.

With reference to FIG. 21, in the present embodiment, the control system 4 includes a data acquisition unit 41, a processor 42 and at least one storage unit 43. The data acquisition unit 41 includes various sensors, and is configured to acquire at least one working parameters during the moving of the robot body 1. The processor 42 is connected to the data acquisition unit 41, transmits at least one moving control instruction to the power system 3 according to the working parameters, and transmits at least one cleaning control instruction to the cleaning device 2 according to the working parameters. The storage unit 43 is connected to the processor 42, is configured to store working parameters and other pre-calculated or preset parameters during the moving of the robot body 1. The working parameters include real-time acceleration data and real-time moving direction data of the robot body 1, real-time liquid level data of the liquid dispensing container, distance between each distance sensor and the solar panel, images in front of the robot body, etc. Pre-calculated or preset parameters include various working data predetermined by a staff member, such as a pre-calculated and pre-planned cleaning robot moving path (optimized path), a liquid level alarm threshold value in the liquid dispensing container 25 (when the threshold value is reached, the alarm unit is activated), liquid level shutdown threshold value (when the threshold value is reached, the water pump 28 stop operating), etc.

A staff member records a planned optimized path in the control system 4 in advance to provide the robot body of the cleaning robot with path navigation. The control system 4 calculates and plans according to the optimized path, and transmits various of signals of when to switch on, when to switch stop, when to move straight, when to implement left or right 90 degrees U-turn to the power system in forms of control instructions to control actions of the moving robot body.

In controlling technologies of the robot body, how to determine whether the robot body moves straight on the sloping plane or not and how to control the robot body to move straight on the sloping plane are the most basic questions. If the robot body lacks supervision during its moving on a straight line, as the robot body is deflected for some reason (for example, the road is uneven, there are obstacles on the road), the phenomenon of getting more and more deflected will occur. In the present invention, it will result in that the robot deflects from the original navigation path and cannot move through the entire sloping plane in the shortest time. In the present invention, it will result in that after the operation of the cleaning robot is completed, there are still many places on the solar panel remained uncleaned timely.

To solve the technical issue of how to determine whether the robot of the present invention moves straight on the slope, the present invention provides the following solutions.

In the control system 4, the data acquisition unit 41 includes at least one accelerometer sensor 411 configured to acquire acceleration data of the robot 100 (or the robot body 1) in real-time. The accelerometer sensor 411 is connected to the processor 42 and transmits acceleration data of the robot body 1 to the processor 42. The processor 42 analyzes dynamic acceleration data and figures out the force direction and moving direction of the robot body during the moving of the robot body. The processor 42 utilizes the acceleration data of the robot 100 to build a three-dimensional coordinate, decompose the data and calculate to define the moving direction of the robot 100 as a Y-axis direction, and to define a direction perpendicular to the sloping plane as a Z-axis direction. A plane on which the X-axis and the Y-axis are located parallels the sloping plane. According to the vectors of the acceleration data along the X-axis direction, it is determined whether the robot body 1 has left or right deflection. If deflection occurs, the processor transmits at least one direction-adjusting instruction to the power system 3 such that the robot body 1 moves back to its original straight path. If no deflection, the processor 42 determines that the robot body 1 moves straight.

Furthermore, to ensure the accuracy of determination of straight line moving, besides determination by an accelerometer sensor, a magnetic sensor technology can be utilized to make a further determination based on the determination of deflection from the original path by the accelerometer sensor, i.e. a second determination by the magnetic sensor. Thus, in the control system 4, the data acquisition unit 41 may also include a magnetic sensor 412 connected to the processor 42. The magnetic sensor 412 measures physical parameters such as current, location, direction, etc. by sensing intensity of magnetic field. In the present invention, the magnetic sensor 412 is configured to acquire moving direction data in real-time and compare the acquired data with a predetermined standard moving direction based on optimized path data to make a determination to ensure whether the robot body moves straight such that the determination of whether the robot body moves straight is more accurate.

To solve the technical issue of how to determine whether the solar panel cleaning robot (abbreviated as "robot" hereinafter) of the present embodiment moves straight, the present embodiment provides a method for determining whether the cleaning robot 100 moves straight on the sloping plane 300, and the method may include steps as follows. Because the solar panel is a sloping plane, therefore the determining method may be utilized to determine whether the solar panel cleaning robot moves straight.

Figure 22:
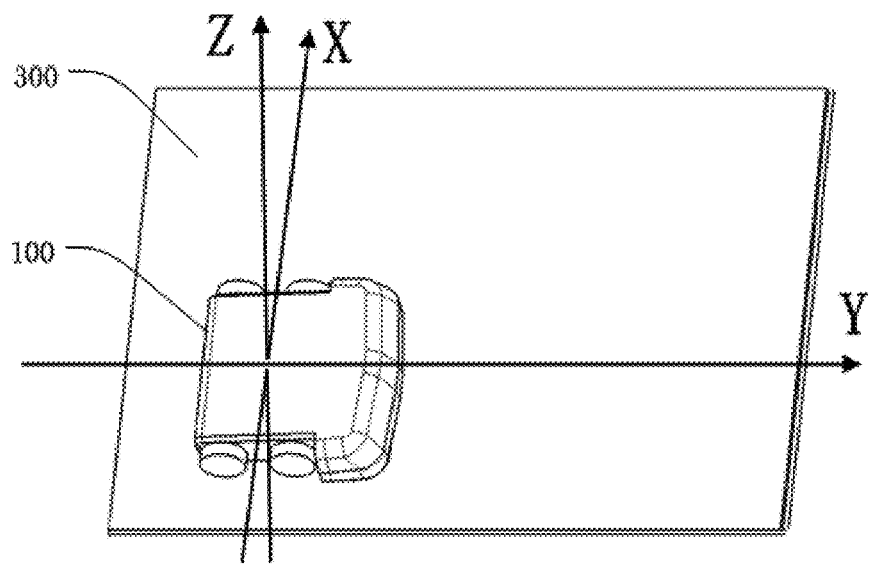
FIG. 22 is a schematic view of a three-dimensional coordinate built on the robot of the embodiment 1 of the present invention.

Step S1), with reference to FIG. 22, includes building a three-dimensional coordinate on the robot, defining the robot moving direction as a positive Y-axis direction, defining a direction perpendicular to the sipping plane as a Z-axis direction, wherein an X-axis is perpendicular to the Y-axis and the Z-axis; wherein a plane on which the X-axis and the Y-axis are located parallels the sloping plane.

step S2) includes defining the robot moving direction as Ts, while standard sub vectors of gravity acceleration g along three directions of the three-dimensional coordinate are defined as $g_{xs0}$, $g_{ys0}$, $g_{zs0}$.

step S3) includes generating a standard direction parameter library, and specifically includes steps as follows: step S31) including controlling the robot to implement uniform circular motion on the sloping plane along a predetermined circular path, wherein an angular velocity of the uniform circular motion is 0.1 to 1.0 degree/second; step S32) including, during the circular motion of the robot, acquiring and recording at least one set of standard direction parameter in real-time at time intervals $t_0$, wherein the time interval $t_0$ is 0.1-5.0 second; each set of the standard direction parameters includes a moving direction Ts of the robot and standard sub vectors $g_{xs0}$, $g_{ys0}$, $g_{zs0}$ corresponding to moving direction; and step S33) including, according to the at least one set of the standard direction parameters, generating a standard direction parameter library. In the case of the angular velocity being 0.1 degree/second of and the acquiring time interval $t_0$ being 1 second, about 3600 seconds are required for the robot 100 to finish one uniform circular motion on the sloping plane 300, and the moving direction Ts and the corresponding standard sub vectors $g_{xs0}$, $g_{ys0}$, $g_{zs0}$, of the robot are acquired every 1 second such that 3600 sets of parameters of different directions are obtained and recorded as 3600 sets of standard direction parameters.

step S4) includes controlling the robot on the sloping plane to move straight toward any one direction Tm along a predetermined straight path.

step S5) extracting the standard sub vector $g_{xm0}$, $g_{ym0}$, $g_{zm0}$ data corresponding to the moving direction Tm from the standard direction parameter library.

step S6) includes acquiring a set of real-time direction parameters in real-time at time intervals t, wherein the real-time direction parameter includes real-time sub vectors of the gravity acceleration g along three directions $g_{xm1}$, $g_{ym1}$, $g_{zm1}$ of the three-dimensional coordinate, and the time interval t is 0.1-1.0 second.

step S7) includes calculating a sub vector difference $g_{xd}=g_{xm1}-g_{xm0}$ between a real-time sub vector of the gravity acceleration g along the X-axis and the standard sub vector.

step S8) includes determining whether the robot moves along the predetermined straight path; wherein when $g_{xd}$ is equal to 0, it is determined that the robot moves along the predetermined straight path, and returning to step S6) is then implemented; when $g_{xd}$ is unequal to 0, it is determined that the robot deflects from the predetermined straight path.

Because the gravity acceleration g of the robot 100 on the sloping plane 300 is a constant, when the robot 100 operates on the sloping plane 300, the moving direction Ts and acceleration sub vector data $g_{xs}$, $g_{ys}$, $g_{zs}$ along the direction should conform to the standard direction parameters in the standard data library. In the present embodiment, determining whether the robot moves straight line is essentially determining whether the robot moves slightly left or right with respect to a straight path. Therefore, it is only needed to determine whether the real-time sub vector of the gravity acceleration g along the X-axis direction is the same as the standard sub vector. If the same, no deflection exists, if difference, deflection occurs. Furthermore, it may be determined whether the deflection is left or right according to whether the sub vector difference $g_{xd}=g_{xm1}-g_{xm0}$ is positive or negative.

Furthermore, the present embodiment also provides another method for determining whether the robot moves straight on the sloping plane, after the above step S8) determines that the robot deflects from the predetermined straight path, steps may be further included as follows: step S9) including, by utilizing a magnetic sensor, acquiring a real-time moving direction Tn; step S10) including comparing the real-time moving direction Tn with the moving direction Tm, if the directions are consistent, it is determined that the robot moves along the predetermined straight path, and returning to step S6) is then implemented; if the directions are inconsistent, it is determined that the robot deflects from the predetermined straight path. Under the circumstance of a former determination indicating deflection of the robot from the straight path, a second determination is implemented to prevent accident, which makes the determination result more precise.

After the control system 4 finds out the moving path of the robot is deflected, the deflection must be corrected immediately suck that the robot can move back to its original path. Such process may be called deflection correction process. To solve the technical issue of how to control the robot to move straight on the sloping plane, the present embodiment provides a method for controlling the robot to move straight on the sloping plane, and the method may include steps as follows.

step S11) includes, according to the above method of the steps S1)-S8) or steps S1)-S10) for determining whether the robot moves straight on the sloping plane, determining whether a robot moves along the predetermined straight path; if the robot deflects the predetermined straight path, then step S12) is implemented.

step S12) includes controlling the robot to deflect toward the Tm direction during moving; wherein the step specifically includes steps as follows: step S121) including extracting an actual moving direction Tn corresponding to the real-time direction parameter in standard direction parameter library; step S122) including calculating a deflection direction and a deflection angle needed for adjusting the robot; the deflection angle is an included angle between the actual moving direction Tn and the predetermined moving direction Tm; step S123) including, according to the deflection direction and the deflection angle needed for adjusting the robot, transmitting a direction-adjusting instruction to the power system 3 to control the robot to deflect left or right.

step S13) includes controlling the robot to move straight on the sloping plane along the Tm direction; returning to step S11) is then implemented.

The method for determining whether the robot moves straight on the sloping plane, as steps S1)-S8), or steps S1)-S10), can quickly determine whether the robot body moves straight on the slope according to a set of acceleration data (and magnetic sensor data) in a very short time. Because the accelerometer sensor can acquire data in real-time, and acquires a set of data every time interval, therefore the above determination process is implemented every time interval regularly. Whenever a robot (robot body) is found deflecting from a straight path on a sloping plane, it can be determined that the robot deflects at this time.

The method for controlling the robot to move straight on sloping plane, as step S11) to step S13), is based on the above technology for determining whether the robot moves straight on the sloping plane. When deflection of the robot is ascertained, the moving direction of the robot is immediately adjusted to make it return to the original path.

In the present invention, the method for determining whether the robot moves straight on the sloping plane and the method for controlling the robot to move straight on the sloping plane are used in conjunction with each other to ensure that the cleaning robot does not deflect during the straight moving such that the cleaning robot can be assured to be able to move through the entire solar panel in the shortest time along the preset optimized navigation path and to clean the entire solar panel fast and well.

According to the principles of the shortest time and the shortest moving path, an optimized navigation path of the robot on a rectangular slope can be easily planned and figured out. With regard to how to make the robot able to move along a preset optimized navigation path, the present invention provides a series of controlling solutions and navigation methods. The navigation method is the controlling method that makes the robot move along the navigation path.

In the present invention, the data acquisition unit 41 may also include at least one distance sensor 413 including but not limited to an ultra sound sensor and an optical pulse sensor. The distance sensor 413 is disposed on an outer edge of the robot 100 (the robot body 1), and specifically can be disposed respectively on four corners of the robot body 1 (body member 11). With reference to FIG. 2, when the robot 100 moves on a rectangular slope, a front end of the distance sensor 413 faces the rectangular slope. The distance sensor 413 is connected to the processor 42 and is configured to acquire distance data of the distance sensor 413 and the rectangular slope in real-time. The processor 42 determines whether the robot body 1 is located on an edge of a corner of the rectangular slope according to the distance data of the distance sensor 413 and the rectangular slope.

In the present invention, a number of the distance sensor 413 is four, and the four distance sensors 413 are disposed respectively one four corners of the robot (the robot body). When only two of the distance sensors 413 are able to acquire the distance data, the processor 42 determines that the robot (the robot body) is located on an edge of a rectangular slope 300, and transmits at least one turning instruction (U-turn) to the power system 3. When only one of the distance sensors 413 acquires the distance data, the processor 42 determines that the robot (the robot body) is located on a certain corner of the rectangular slope 300, and transmits at least one turning instruction (90 degrees turn or U-turn) to the power system 3. The four distance sensors 413 may also be disposed respectively on middle portions of four sides of the robot body 1. When finding that the distance sensor 413 on one side is unable to acquire distance data, the processor 42 may determine that the side is located on the edge of the rectangular slope. If two adjacent sides are both located on the edge of the rectangular slope, it may be determined that the robot body 1 is located on a certain corner of the solar panel 200. The number of the distance sensor 413 may be eight, and the eight distance sensors 413 are disposed respectively on the four corners of the robot body 1 or on the middle portions of the four sides of the robot body 1.

The control system 4 may further include a counter 414 configured to calculate corners through which the robot body 1 passes during the moving on the sloping plane. In a work of the robot, whenever the processor 42 determines that the robot body reaches a certain corner, a variable "1" is added to the counter. The processor 42, through a technical result feedbacked by the counter 414, can explicitly know an order of the corners that the robot body 1 reaches (a certain corner).

A staff member records a planned optimized path in a storage member of the control system 4 in advance. The processor transmits control instructions including start, stop, straight moving, left or right 90 degrees turn, left or right U-turn (180 degrees turn to an adjacent car lane) to the power system 3 according to the navigation path and the real-time location of the robot (robot body) to control the robot body to move based on the navigation path during the moving.

The present embodiment discloses four path navigation methods for robot moving on the rectangular slope, and details will be shown below. The solar panel is also a rectangular slope, the path navigation method for the cleaning robot to move the solar panel is also applied to the path navigation method for the robot to move on the rectangular slope below.

A first embodiment of path navigation method for the robot to move on a rectangular slope, disclosed in the present embodiment, includes steps as follows: step S101) including setting a left-lower corner of the rectangular slope as a navigation starting point; step S102) including controlling the robot to move straight from the navigation starting point to a left-upper corner of the rectangular slope; step S103) including detecting in real-time whether the robot reaches a first corner of the rectangular slope; if the robot does not reach the first corner, returning to step S102) is then implemented; if the robot reaches the first corner, controlling the robot to turn right 90 degrees is implemented; step S104) including controlling the robot to move straight; step S105) including detecting in real-time whether the robot reaches a second corner of the rectangular slope; if the robot does not reach the second corner, returning to step S104) is then implemented; if the robot reaches the second corner, controlling the robot to implement a right U-turn is implemented, and after the U-turn controlling the robot to move straight is implemented; step S106) including detecting in real-time whether the robot reaches an edge of the rectangular slope; if the robot reaches the edge of the rectangular slope, controlling the robot to implement a left U-turn is implemented, after the U-turn controlling the robot to move straight is implemented, and step 107) is then implemented; step S107) including detecting in real-time whether the robot reaches the edge of the rectangular slope; if the robot reaches the edge of the rectangular slope, controlling the robot to implement a right U-turn is implemented, and after the U-turn controlling the robot to move straight is implemented; returning to step S106) is then implemented. During implementation of step S106) and step S107). detecting in real-time whether the robot reaches the third corner of the rectangular slope is implemented; if the robot reaches the third corner, detecting in real-time whether the robot reaches the fourth corner of the rectangular slope is implemented; if the robot reaches the fourth corner, controlling the robot to stop moving is implemented.

Figure 23:
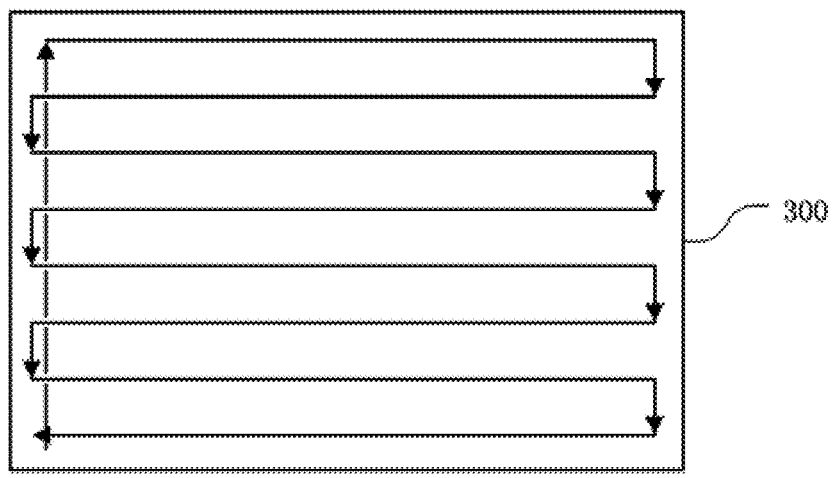
FIG. 23 is a moving path schematic view of the robot utilizing a first embodiment of a path navigation method to move on the rectangular slope.
Figure 24:
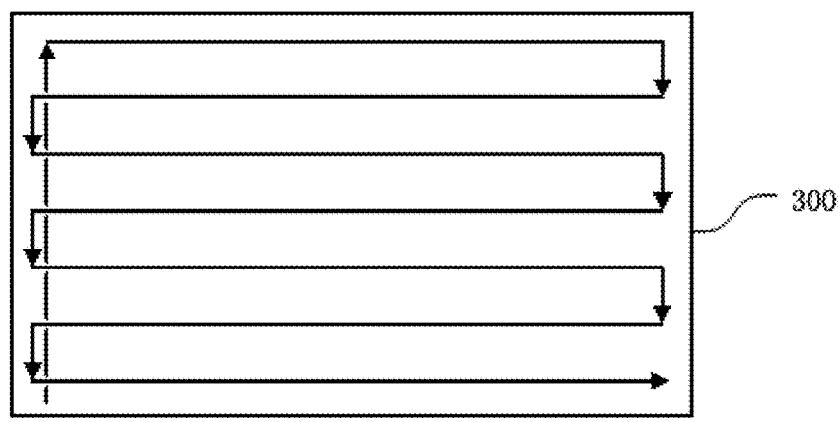
FIG. 24 is another moving path schematic view of the robot utilizing the first embodiment of the path navigation method to move the rectangular slope.

There may be various moving paths of the robot utilizing the first embodiment of the path navigation method on the rectangular slope. Because a ratio of the length and width of each rectangular slope and that of the length and width of each robot are different, therefore moving paths of robots are different, and the locations on which the robots stop are different (stop at the left-lower corner or the right-lower corner). With reference to FIGS. 23 and 24, two possible moving paths along which the robot 100 moves on the rectangular slope 300 by using the first embodiment of the path navigation method are shown.

A second embodiment of the path navigation method for the robot to move on the rectangular slope, disclosed in the present embodiment, includes steps as follows: step S201) including setting the right-lower corner of the rectangular slope as a navigation starting point; step S202) including controlling the robot to move straight from the navigation starting point to the right-upper corner of the rectangular slope; step S203) including detecting in real-time whether the robot reaches the first corner of the rectangular slope; if the robot does not reach the first corner, returning to step S202) is then implemented; if the robot reaches the first corner, controlling the robot to turn loft 90 degrees is implemented; step S204) including controlling the robot to move straight; step S205) including detecting in real-time whether the robot reaches the second corner of the rectangular slope; if the robot does not reach the second corner, returning to step S204) is then implemented; if the robot reaches the second corner, controlling the robot to implement a left U-turn is implemented, and after the U-turn controlling the robot to move straight is implemented; step S206) including detecting in real-time whether the robot reaches the edge of the rectangular slope; if the robot reaches the edge of the rectangular slope, controlling the robot to implement a right U-turn is implemented, after the U-turn controlling the robot to move straight is implemented, and step S207) is then implemented; step S207) including detecting real-time whether the robot reaches the edge of the rectangular slope; if the robot reaches the edge of the rectangular slope, controlling the robot to implement a left U-turn is implemented, and after the U-turn controlling the robot to move straight is implemented; returning to step S206) is then implemented. During implementation of step S206) and step S207), detecting in real-time whether the robot reaches the third corner of the rectangular slope is implemented; if the robot reaches the third corner, detecting in real-time whether the robot reaches the fourth corner of the rectangular slops is implemented; if the robot reaches the fourth corner, controlling the robot to stop moving is implemented.

Figure 25:
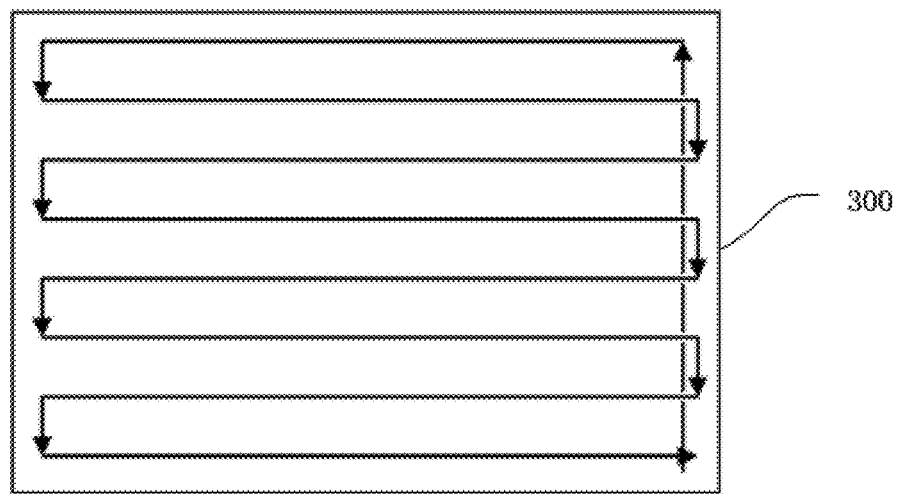
FIG. 25 is a moving path schematic view of the robot utilizing a second embodiment of the path navigation method to move on the rectangular slope.
Figure 26:
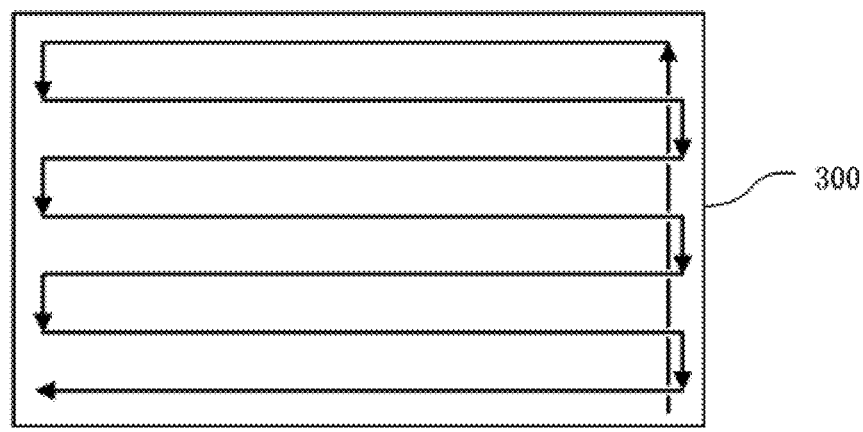
FIG. 26 is another moving path schematic view of the robot utilizing the second embodiment of the path navigation method to move on the rectangular slope.

There may be various moving paths of the robot utilizing the second embodiment of the path navigation method on the rectangular slope. Because a ratio of the length and width of each rectangular slope and that of the length and width of each robot are different, therefore moving paths of robots are different, and the locations on which the robots stop are different (stop at the left-lower corner or the right-lower corner). With reference to FIGS. 25 and 26, two possible moving paths along which the robot 100 moves on the rectangular slope 300 by using the second embodiment of the path navigation method are shown.

A third embodiment of the path navigation method for the robot to move on the rectangular slope, disclosed in the present embodiment, includes steps as follows: step S301) including setting the left-lower corner of the rectangular slope as a navigation starting point; step S302) including controlling the robot to move straight from the navigation starting point to the left-upper corner of the rectangular slope; step S303) including detecting in real-time whether the robot reaches the first corner of the rectangular slope; if the robot does not reach the first corner, returning to step S302) is then implemented; if the robot reaches the first corner, controlling the robot to implement a right U-turn is implemented, and after the U-turn controlling the robot to move straight is implemented; step S304) including detecting in real-time whether the robot reaches the edge of the rectangular slope; if the robot reaches the edge of the rectangular slope, controlling the robot to implement a left U-turn is implemented, and after the U-turn controlling the robot to move straight is implemented, and step S305) is then implemented; controlling the robot to move straight is implemented, and detecting in real-time step S305) including detecting in real-time whether the robot reaches the edge of the rectangular slope; if the robot reaches the edge of the rectangular slope, controlling the robot to implement a right U-turn is implemented, after the U-turn controlling the robot to move straight is implemented; returning to step S304) is then implemented. During implementation of step S304) and step S305), detecting in real-time whether the robot reaches the second corner of the rectangular slope is implemented; if the robot reaches the second corner, detecting in real-time whether the robot reaches the third corner of the rectangular slope is implemented; if the robot reaches the third corner, controlling the robot to stop moving is implemented.

Figure 27:
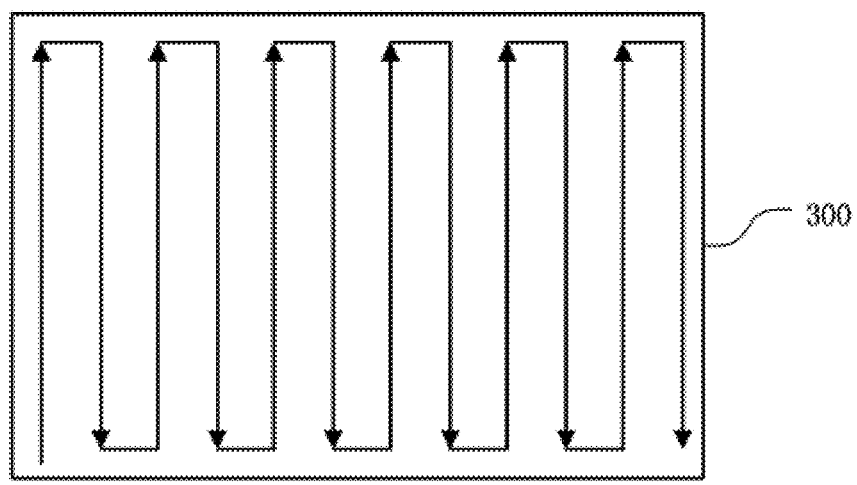
FIG. 27 is a moving path schematic view of the robot utilizing a third embodiment of the path navigation method to move on the rectangular slope.
Figure 28:
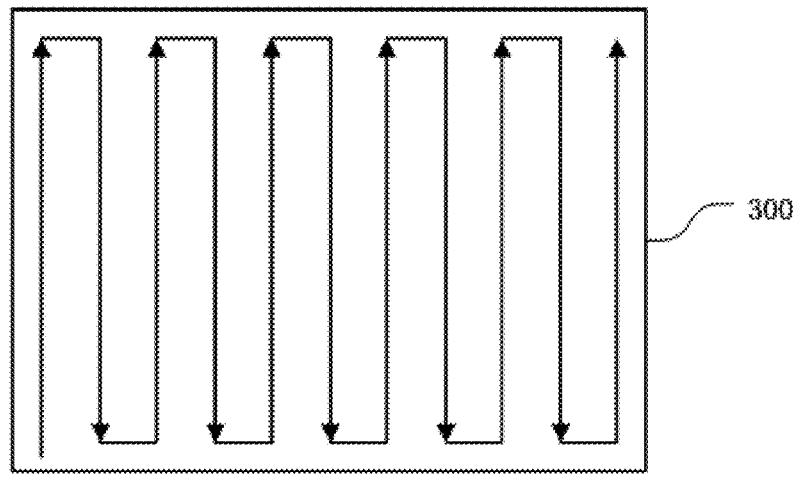
FIG. 28 is another moving path schematic view of the robot utilizing the third embodiment of the path navigation method to move on the rectangular slope.

There may be various moving paths of the robot utilizing the third embodiment of the path navigation method on the rectangular slope. Because a ratio of the length and width of each rectangular slope and that of the length and width of each robot are different, therefore moving paths of robots are different, and the locations on which the robots stop are different (stop at the left-lower corner or the right-lower corner). With reference to FIGS. 27 and 28, two possible moving paths along which the robot 100 moves on the rectangular slope 300 by using the third embodiment of the path navigation method are shown.

A fourth embodiment of the path navigation method for the robot to move on the rectangular slope, disclosed in the present embodiment, includes steps as follows: step S401) including setting the right-lower corner of the rectangular slope as a navigation starting point; step S402) including controlling the robot to move straight from the navigation starting point to the right-upper corner of the rectangular slope; step S403) including detecting in real-time whether the robot reaches the first corner of the rectangular slope; if the robot does not reach the first corner, returning to step S402) is then implemented; if the robot reaches the first corner, controlling the robot to implement a left U-turn is implemented, and after the U-turn controlling the robot to move straight is implemented; step S404) including detecting in real-time whether the robot reaches the edge of the rectangular slope; if the robot reaches the edge of the rectangular slope, controlling the robot to implement a right U-turn is implemented; step S406) including detecting in real-time whether the robot reaches the second corner of the rectangular slope; if the robot does not reach the second corner, controlling the robot to move straight is implemented; if the robot reaches the second corner, controlling the robot to move straight is implemented, and detecting in real-time whether the robot reaches the third corner of the rectangular slope is implemented; if the robot does not reach the third corner, controlling the robot to move straight is implemented; if the robot reaches the third corner, controlling the robot to stop moving is implemented; step S407) including detecting in real-time whether the robot reaches the edge of the rectangular slope; if the robot reaches the edge of the rectangular slope, controlling the robot to implement a left U-turn is implemented; returning to step S404) is then implemented. During implementation of step S404) and step S405), detecting in real-time whether the robot reaches the second corner of the rectangular-slope is implemented; if the robot reaches the second corner, detecting in real-time whether the robot reaches the third corner of the rectangular slope is implemented; if the robot reaches the third corner, controlling the robot to stop moving is implemented.

Figure 29:
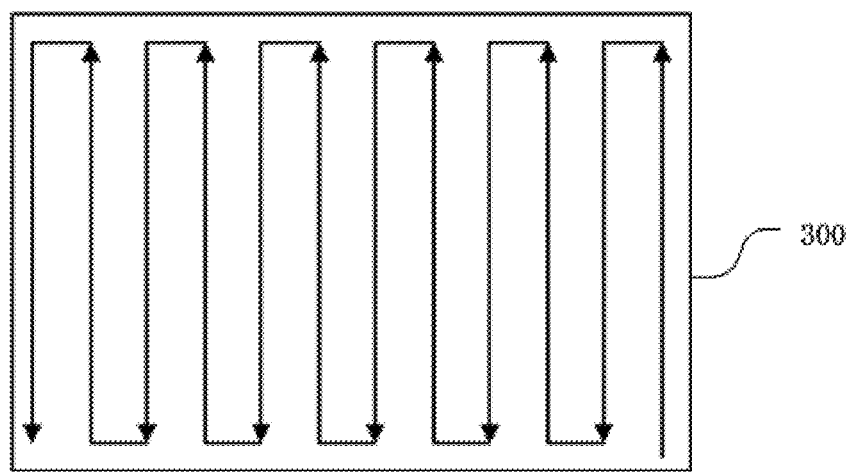
FIG. 29 is a moving path schematic view of the robot utilizing a fourth embodiment of the path navigation method to move on the rectangular slope.
Figure 30:
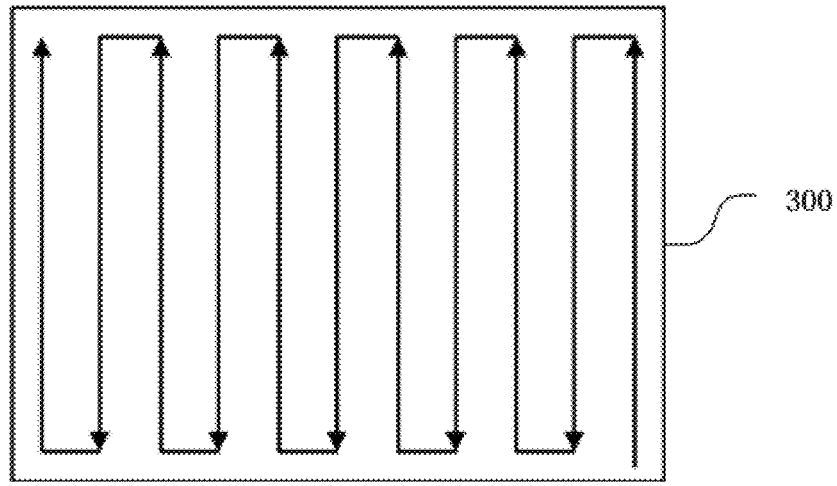
FIG. 30 is a moving path schematic view of the robot utilizing the fourth embodiment path navigation method to move on the rectangular slope.

There may be various moving paths of the robot utilizing the fourth embodiment of the path navigation method on the rectangular slope. Because a ratio of the length and width of each rectangular slope and that of the length and width of each robot are different, therefore moving paths of robots are different, and the locations on which the robots stop are different (stop at the left-lower corner or the right-lower corner). With reference to FIGS. 29 and 30, two possible moving paths along which the robot 100 moves on the rectangular slope 300 by using the fourth embodiment of the path navigation method are shown.

In the above four path navigation methods for the robot to move on the rectangular slope, specific ways of determining whether the robot moves straight, or controlling the robot to move straight has been described above, and will not be given here. Controlling the robot to turn left or right 90 degrees, has been described in the above introduction of the power system, and will not be given here.

In the above four path navigation methods for the robot to move on the rectangular slope, detecting in real-time whether the robot reaches a corner or an edge of the rectangular slope, specifically includes steps as follows: step S1011) including disposing distance sensors 413 respectively on a left-front portion, a right front portion, a left-rear portion and a right-rear portion of the robot, wherein the distance sensors 413 extend to the external of the robot, and the distance sensors 413 face the rectangular slope, i.e. the solar panel 200; step S1012) including by sequentially utilizing four numerals for the distance sensors 413, defining the distance sensor 413 of the left-front portion, right-front portion, left-rear portion and right-rear portion of the robot respectively as a sensor N1, a sensor N2, a sensor N3 and a sensor N4; step S1013) including, according to sensor signals simultaneously acquired by the robot at any one time, determining a location of the robot the robot; when the robot simultaneously acquires a signal of the sensor N3 and a signal of the sensor N4, it is determined that the robot reaches the edge of the rectangular slope; when the robot can only acquire a signal of the sensor N4 signal, it is determined that the robot reaches the first corner or second corner of the rectangular slope; when the robot can only acquire a signal of the sensor N3 signal, it is determined that the robot reaches the third corner or fourth corner of the rectangular slope; step S1014) including, when it is determined that the robot reaches a corner of the rectangular slope, reading a counting result of the counter to determine an order of the corner (which one of the corner).

In the above four path navigation methods for the robot to move on the rectangular slope, controlling the robot to implement a left U-turn, specifically includes steps as follows: step S1031) including controlling the robot to implement a left on-the-spot turn 90 degrees; step S1032) including controlling the robot to move straight for a certain distance, the certain distance is equal to a width of the robot; and step S1033) including controlling the robot to implement a left on-the-spot turn 90 degrees.

In the above four path navigation methods for the robot to move on the rectangular slope, controlling the robot to implement a right U-turn, specifically includes steps as follows: step S1041) including controlling the robot to implement a right on-the-spot turn 90 degrees; step S1042) including controlling the robot to move straight for a certain distance, the certain distance is equal to the width of the robot; step S1043) including controlling the robot to implement a right on-the-spot turn degrees.

The technical effect of the above four path navigation methods for the robot to move on the rectangular slope is that the robot is allowed to move through each corner of the rectangular slope by the shortest path in the shortest time, which achieves full coverage to the rectangular slope. In the present embodiment. The cleaning robot can utilize any one of the above four path navigation methods to move through each corner of the solar panel in a short time and effectively clean the solar panel. Because sewage is generated during the cleaning process and may fall off along the solar panel, therefore cleaning effects of the third embodiment and the fourth embodiment of the path navigation method are probably not so good, and the first embodiment and the second embodiment of the path navigation method are preferable.

The data acquisition unit 41 further includes a liquid level sensor 259 connected to the processor 42 and configured to acquire liquid level in the liquid dispensing container 25 in real-time. During work of the cleaning device, the control system 4 may transmit at least one water pump 28 control signal to the water pump 28 according to real-time liquid level data in the liquid dispensing container 25 to start or stop operation of the water pump 28, or to control discharging speed of liquid. For example, when real-time liquid level data in the liquid dispensing container 25 decreases to a predetermined threshold value, the control system 4 can transmit a water pump decelerating instruction controlling the water pump 28 to slow down water pumping speed. When real-time liquid level data in the liquid dispensing container 25 decreases to the lowest point, or, when the control system 4 transmits a robot body stopping instruction, the control system 4 can transmit a water pump stopping instruction controlling the water pump 28 to stop operation.

The control system 4 further includes at least one alarm unit 44 connected to the processor 42. The alarm unit 44 may be a red light or a buzzer disposed on the external of the robot body. When a certain working parameter exceeds the predetermined threshold value, the alarm unit transmits an alarming signal. For example, when the liquid level of the liquid dispensing container 25 is lower than a certain predetermined threshold value, or when the electric power system 5 has insufficient electric power, or when the cleaning robot transmits a malfunction signal, the alarm unit 44 may transmit an alarming signal to warn a user.

The data acquisition unit 41 includes at least one image sensor 415 or camera connected to the processor 42, disposed on the front end of the robot body 1 (with reference to FIGS. 2 and 3) and configured to acquire images in front of the robot body 1 during the moving of the robot body 1. These images can be stored in the storage unit for a staff member to check the working status of robot.

In the present invention, technical effect of the control system 4 is providing various methods for the cleaning robot to move along an optimized path on the solar panel and methods for controlling the robot to move straight on the sloping plane to ensure the robot to non-repeatedly move through the entire space of the solar panel with large coverage area without the robot falling out from an edge of the solar panel, which assures both the cleaning effect and working efficiency.

The solar panel cleaning robot 100 may also include at least one wireless communication unit 45 wirelessly connected to a server 400, and configured to build communication between the solar panel cleaning robot 100 and server 400. Images in front of the robot body 1 can be transmitted to the server 400 in real-time such that a staff member may efficiently implement monitoring during the working progress of the cleaning robot, which solves the technical issue that monitoring the clean robot on the conventional solar panel becomes difficult when the solar panel is high.

In the present invention, with reference to FIG. 3, the electric power system 5 is one or a set of disposable batteries or rechargeable batteries (not shown in the figures) disposed in the battery box 51. A staff member needs to regularly remove the cleaning robot from the solar panel and replace or charge the battery therein to allow the clean robot to continue to work.

The embodiment 1 provides a solar panel cleaning robot that may freely move on the solar panel and effectively remove the dust on the panel and other attachments, and decontamination effect thereof is excellent. During operation of the cleaning robot of the present invention on the solar panel, the cleaning robot can non-repeatedly cover the entire space of the solar panel according to the preset optimized path with high working efficiency. The cleaning robot of the present invention can automatically turn or back turn according to the program to achieve automatic control and is easy to operate.

Embodiment 2

Figure 31:
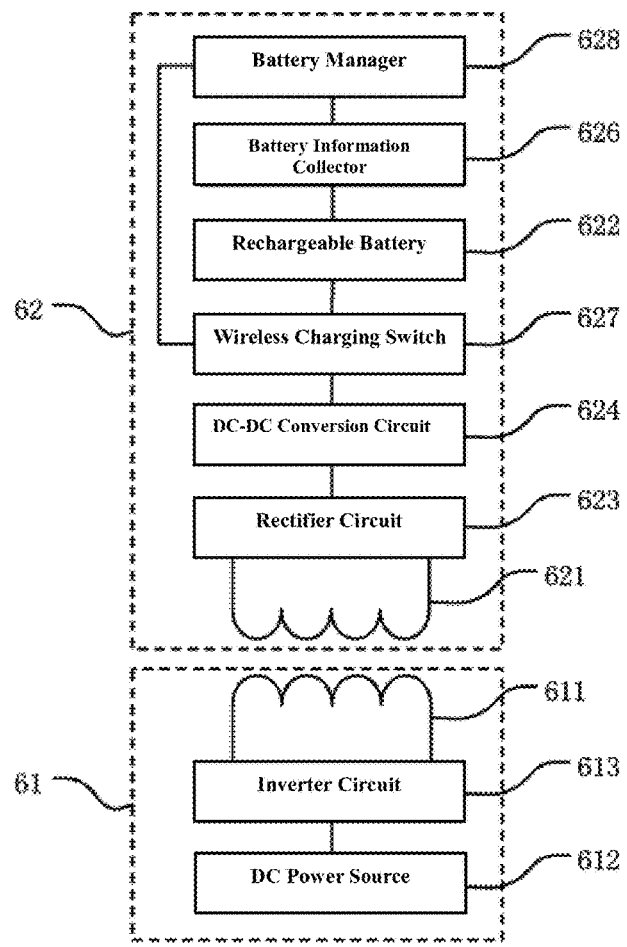
FIG. 31 is a structure schematic view of a wireless charging system of an embodiment 2 of the present invention.
Figure 32:
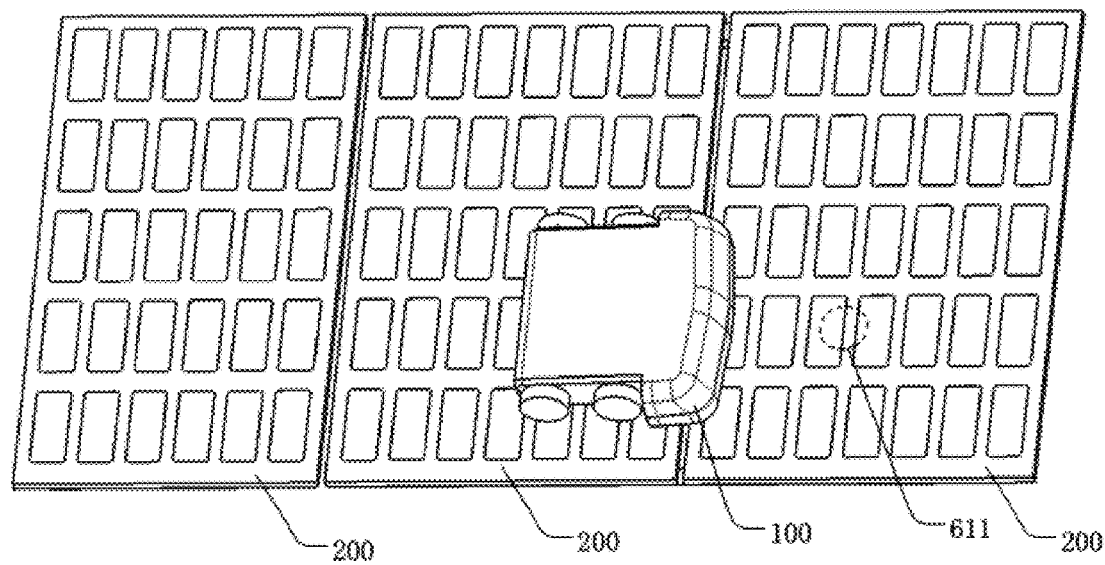
FIG. 32 is a status schematic view of the transmitting coil of the embodiment 2 of the present invention disposed on the lower surface of the solar panel.
Figure 33:
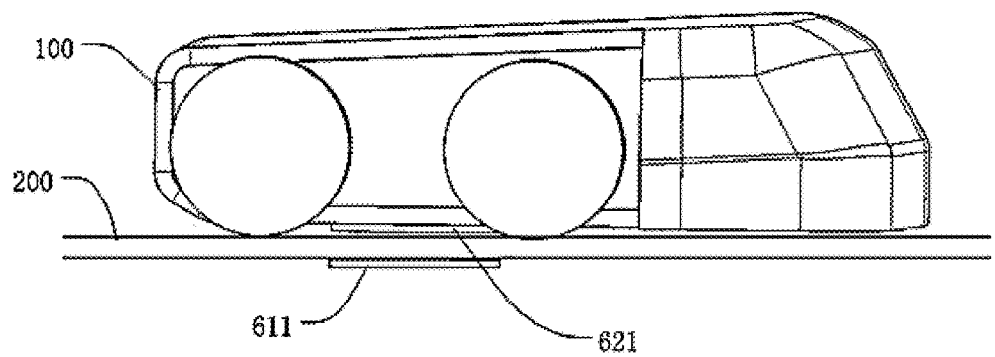
FIG. 33 is a working status schematic view of the receiving coil of the embodiment 2 of the present invention couple to the transmitting coil.

Most of the technical solutions of the embodiment 2 and embodiment 1 are the same and a difference is that the embodiment 2 further includes a solar panel cleaning robot wireless charging system (may be abbreviated as "wireless charging system"). With reference to FIGS. 31 to 33, the wireless charging system 6 includes at least one wireless power transmitting device 61 disposed on an external of the cleaning robot, and a wireless power receiving device 62 disposed on an internal or an outer surface of the cleaning robot. Each the wireless power transmitting device 61 includes a transmitting coil 611, and the transmitting coil 611 is directly or indirectly connected to a power source. The wireless power receiving device 62 includes a receiving coil 621, and the receiving coil 621 is directly or indirectly connected to a rechargeable battery 622. When the receiving coil 612 is located above the transmitting coil 611, the receiving coil 612 and the transmitting coil 611 implement electromagnetic induction coupling or magnetic resonance coupling such that the transmitting coil 611 transmits wireless electric power to the receiving coil 612.

From the specific technical principles and solutions, the current wireless charging technologies are mainly four basic ways that are electromagnetic induction, magnetic resonance, radio wave and electric field coupling, respectively for short range, short-medium range and remote electric power transmissions. In the present invention electromagnetic induction and magnetic resonance are utilized, preferably the electromagnetic induction employed. In the field of wireless charging, the most mature and most common technology is the electromagnetic induction, and the fundamental principle thereof is the use of electromagnetic induction principle, which is similar to the transformer. Two coils are disposed respectively on a transmitting terminal and a receiving terminal, because the electromagnetic induction in the secondary coil produces a certain current, energy will be transferred from the transmitting terminal to the receiving terminal.

In the present embodiment, to ensure the energy conversion efficiency of the solar panel, the wireless power transmitting device 61 can be installed close to the solar panel 200, but cannot influence normal work of the solar panel. With reference to FIG. 32, the transmitting coil 611 can be disposed on a lower surface of any one solar panel 200. With reference to FIG. 33, the receiving coil 612 can be disposed on a lower surface of a bottom of the cleaning robot 100. The receiving coil 612 is disposed safely on the external of the robot body 1 and is located on the lowest portion of the robot body such that the receiving coil 612 is close to the transmitting coil 611 as much as possible. Because a thickness of the solar panel 200 is thinner and generally a few millimeters, therefore in the present embodiment, the receiving coil 612 can be disposed on a bottom layer of the internal of the cleaning robot 100.

Figure 34:
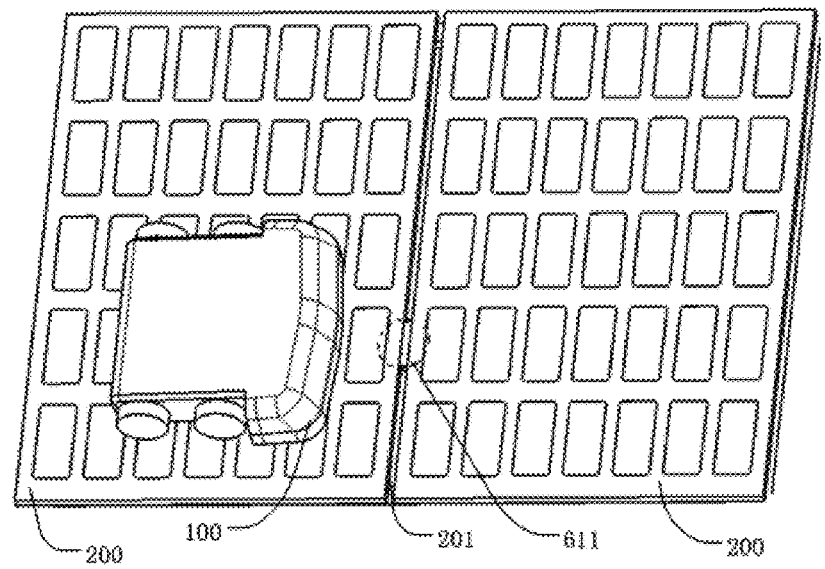
FIG. 34 is a status schematic view of the transmitting coil of the embodiment 2 of the present invention disposed under a gap on a connection portion of two solar panels.
Figure 35:
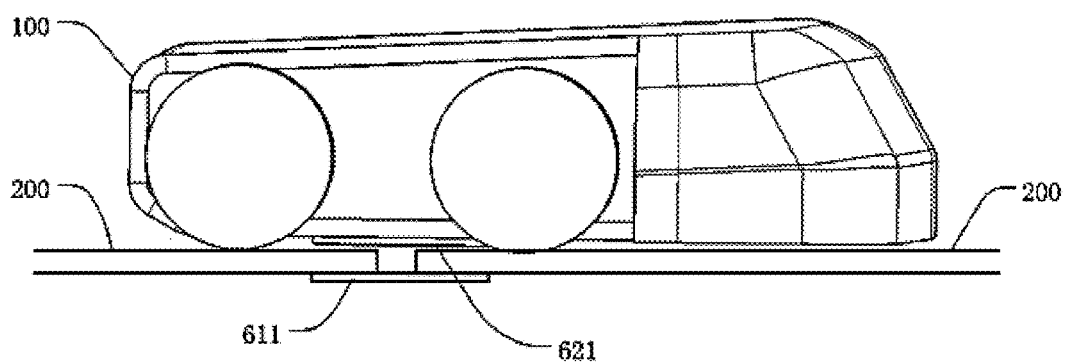
FIG. 35 is another working status schematic view of the receiving coil of the embodiment 2 of the present invention couple to the transmitting coil.

With reference to FIG. 34, the transmitting coil 611 can also be disposed below a gap of a connection portion adjacent two solar panels 200. If the gap 201 is larger, a width of the gap 201 is larger than a diameter of the transmitting coil 611, the transmitting coil 611 can be disposed in the gap 201. With reference to FIG. 35, the receiving coil 612 stops when moving above the transmitting coil 611, and the receiving coil 612 is coupled to the transmitting coil 611.

The transmitting coil 611 continuously passes alternating current with a certain frequency. When the robot moves above the transmitting coil 611, the transmitting terminal 611 and the receiving terminal 621 build communication. Because electromagnetic induction coupling effect, alternating current with a certain frequency is also generated in the receiving coil 612 such that energy is transferred from the wireless power transmitting device 61 to the wireless power receiving device 62. The robot moves above the transmitting coil 611 and builds communication, the receiving coil 612 may be right above the transmitting coil 611, and may be at near a place right above the transmitting coil 611, as long as the communication is built to achieve the wireless charging. When the receiving coil 612 is located right above the transmitting coil 611, the coupling effect is the best, the charging rate is highest and the charging speed is fastest.

The insufficiency of the electromagnetic induction wireless charging technology is that the effective power transmission distance is relatively short, and only within a distance from a few millimeters to several centimeters can the energy be stably and efficiently transferred. Therefore, in the present embodiment, a distance between the receiving coil 612 and the transmitting coil 611 should be short as much as possible. When the receiving coil 612 is located above the transmitting coil 611, the receiving coil 612 and the transmitting coil 611 implements electromagnetic induction coupling, the distance between the transmitting coil 611 and the receiving coil 612 is 1 mm to 40 mm, and may preferably be 2 mm, 5 mm, 10 mm, 15 mm and 20 mm, which ensures to stably and high efficiently achieve charging function and facilitate installation and maintenance. The distance between the transmitting coil 611 and the receiving coil 612 refers to a distance between a plane on which the transmitting coil 611 is located and a plane on which the receiving coil 612 is located when the transmitting coil 611 and the receiving coil 612 parallel to each other. In the present embodiment, mediums existing between the transmitting coil 611 and the receiving coil 612 are all non-metallic, and the mediums therebetween include the solar panel, robot housing, air etc. Material of the solar panel is standard silicon material. The robot housing is rigid plastic material (such as polymer resin material). In the solar panel, no metallic material exists on a connection portion between adjacent two solar panels (for example, edge frame). When the receiving coil 612 and the transmitting coil 611 implements electromagnetic induction coupling, once metallic material exists in the electromagnetic field, parts will be heated and damaged. Therefore, no metal can exist near the receiving coil 612 and the transmitting coil 611.

With reference to FIG. 31, the wireless power transmitting device 61 may include a DC power source 612, an inverter circuit 613 and a transmitting terminal controller 614. The DC power source 612 is configured to provide direct current. The inverter circuit 613 has an input terminal connected to the DC power source 612 and an output terminal connected to the transmitting coil 611. The transmitting terminal controller 614 is connected to the inverter circuit 613, and is configured to control an output power of the inverter circuit 613. The inverter circuit 613 is configured to convert the direct current to alternating current with variable frequency and duty cycle, and outputs the alternating current to the transmitting coil 611.

Figure 36:
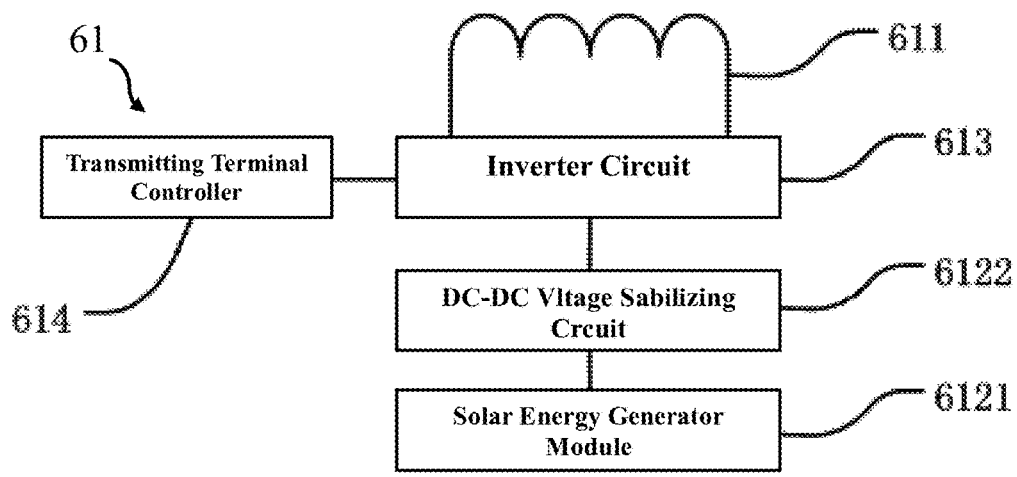
FIG. 36 is a structure schematic view of a wireless power transmitting device of the embodiment 2 of the present invention.
Figure 37:
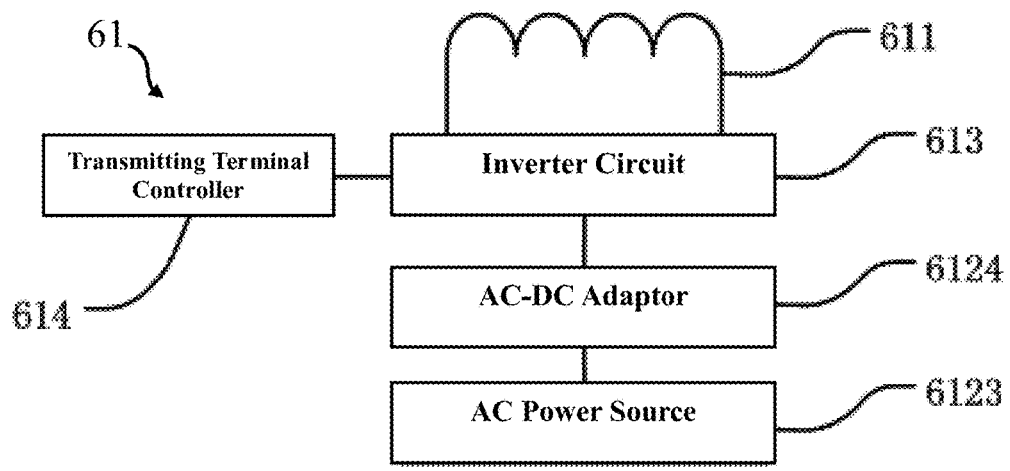
FIG. 37 is another structure schematic view of the wireless power transmitting device of the embodiment 2 of the present invention.

With reference to FIG. 36, the DC power source 612 may be at least one solar energy generator module 6121. The present embodiment is directly applied to the solar panel 200, and therefore power from solar energy generation can directly be a DC power source of the present embodiment. Because a DC voltage outputted by the solar energy generator module 6121 is not stable, the wireless power transmitting device 61 needs to be disposed with a DC-DC voltage stabilizing circuit 6122 having an input terminal connected to the solar energy generator module 6121 and an output terminal connected to an input terminal of the inverter circuit 613. The DC-DC voltage stabilizing circuit 6122 is configured to implement regulatory process to the direct current to make the inverter circuit 613 acquire a stable direct current source. With reference to FIG. 37, the DC power source 612 can further include an AC power source 6123 and an AC-DC adapter 6124. The AC power source 6123 is configured to provide alternating current. An input terminal of the AC-DC adapter 6124 is connected to the AC power source 6123, and an output terminal of the AC-DC adapter 6124 is connected to the input terminal of the inverter circuit 613. The AC-DC adapter 6124 is configured to convert the alternating current to a stable direct current.

With reference to FIG. 31, the wireless power receiving device 62 further includes a rectifier circuit 623, a DC-DC conversion circuit 624 and a receiving terminal controller 625. An input terminal of the rectifier circuit 623 is connected to the receiving coil 612, and is configured to convert the alternating current of the receiving coil 612 to a direct current. The DC-DC conversion circuit 624 has an input terminal connected to an output terminal of the rectifier circuit 623 and an output terminal connected to the rechargeable battery 622. The receiving terminal controller 625 is connected to the DC-DC conversion circuit 624. The receiving terminal controller 625 stores at least one charging curve of the rechargeable battery 622 therein, and calculates an optimized charging voltage of the rechargeable battery 622 according to the charging curve. The DC-DC conversion circuit 624 converts a voltage of the direct current outputted by the rectifier circuit 623 to the optimized charging voltage of the rechargeable battery to charge the rechargeable battery.

With reference to FIG. 31, the wireless power receiving device 62 further includes a battery information collector 626, a wireless charging switch 627 and a battery manager 628.

The battery information collector 626 is connected to the rechargeable battery 622, and is configured to acquire a remaining capacity state of charge (SOC) value of the rechargeable battery 622. The wireless charging switch 627 having an end connected to the DC-DC conversion circuit 624 and another end connected to the rechargeable battery 622 or the rectifier circuit 623. The battery manager 628 has an end connected to the battery information collector 626 to acquire the remaining capacity SOC value of the rechargeable battery 622 in real-time and another connected to the wireless charging switch 627 to control the wireless charging switch 627 to be on or off. When the remaining capacity SOC value of the rechargeable battery 622 is less than a predetermined capacity threshold value, the battery manager 628 controls the wireless charging switch 627 to switch off. When the remaining capacity SOC value of the rechargeable battery 622 is greater than or equal to a charging capacity threshold value (for example, 90% or 100%), the battery manager 628 controls the wireless charging switch 627 to be off.

During the wireless charging process of the solar panel cleaning robot, the technical issue of the wireless power transmitting device 61 and the wireless power receiving device 62 realizing data communication needs to be solved.

Figure 38:
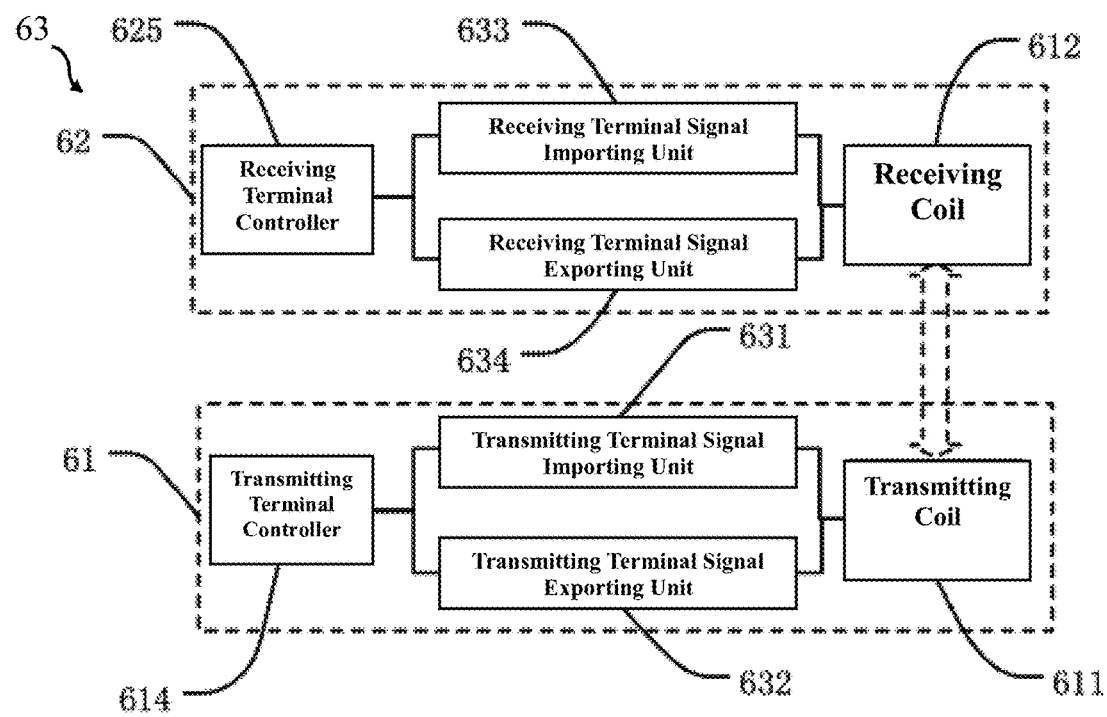
FIG. 38 is a structure schematic view of a wireless communication system of the embodiment 2 of the present invention.

With reference to FIG. 38, a wireless power transmitting device 61 and the wireless power receiving device 62 are combined to form a wireless communication system 63. The wireless power transmitting device 61 includes a transmitting terminal signal importing unit 631 connected to the transmitting coil 611 and a transmitting terminal signal exporting unit 632 connected to the transmitting coil 611. The wireless power receiving device 62 includes a receiving terminal signal importing unit 633 connected to the receiving coil 612 and a receiving terminal signal exporting unit 634 connected to the receiving coil 612.

When the receiving coil 612 and the transmitting coil 611 implements electromagnetic induction coupling, the wireless power transmitting device 61 and the wireless power receiving device 62 implements carrier wave communication. The transmitting terminal signal importing unit 631 modulates information to be transmitted by a carrier wave frequency K1 and inputs the information to a transmitting current of the transmitting coil 611. The receiving terminal signal exporting unit 634 demodulates the information in a receiving current of the receiving coil 612 by modulating the frequency K1 and exports the information. The receiving terminal signal importing unit 633 modulates information to be transmitted by a carrier wave frequency K2 and inputs the information to a receiving current of the receiving coil 612. The transmitting terminal signal exporting unit 632 demodulates the information in a transmitting current of the transmitting coil 611 by modulating the frequency K2 and exports the information.

When the receiving coil 612 and the transmitting coil 611 implements magnetic resonance coupling, the wireless power transmitting device 61 and the wireless power receiving device 62 implements carrier wave communication. The transmitting terminal signal importing unit 631 modulates information to be transmitted in a transmitting current of the magnetically resonant transmitting coil 611 by using a magnetic resonance frequency K3 as a carrier wave. The receiving terminal signal exporting unit 634 demodulates the information from a receiving current of the receiving coil 612 by using the magnetic resonance frequency K3 as the carrier wave, and filters out and exports the information. The receiving terminal signal importing unit 633 modulates information to be transmitted in a magnetically resonant receiving current by using the magnetic resonance frequency K3 as the carrier wave. The transmitting terminal signal exporting unit 632 demodulates the information by using the magnetic resonance frequency K3 as the carrier wave, and filters out and exports the information.

During the wireless charging process of the solar panel cleaning robot, to increase use rate of electricity, lengthen usage life of the battery and ensure battery safety, the technical issue of adjusting a charging power in real-time according to the real-time capacity of the rechargeable battery 622 needs to be solved. To this end, in the present embodiment, the transmitting terminal controller is connected to the transmitting terminal signal importing unit 631, the transmitting terminal signal exporting unit 632. The receiving terminal controller 625 is connected to the receiving terminal signal importing unit 633 and the receiving terminal signal exporting unit 634. The receiving terminal controller 625 stores at least one charging curve of the rechargeable battery 622 therein, acquires an optimized charging voltage of the rechargeable battery 622 in real-time according to the charging curve, calculates an optimized charging power according to the optimized charging voltage, and transmits at least one charging-power-adjusting instruction. When the receiving coil 612 and the transmitting coil 611 implements electromagnetic induction coupling, the receiving terminal signal importing unit 633 modulates the charging-power-adjusting instruction by a carrier wave frequency K2 and inputs the instruction in the receiving current. The transmitting terminal signal exporting unit 632 demodulates the charging-power-adjusting instruction in the transmitting current by modulating the frequency K2 and exports the instruction to the transmitting terminal controller 614. Alternatively, when the receiving coil 612 and the transmitting coil 611 implements magnetic resonance coupling, the receiving terminal signal importing unit 633 modulates the charging-power-adjusting instruction in a magnetically resonant receiving current by using the magnetic resonance frequency K3 as a carrier wave. The transmitting terminal signal exporting unit 632 demodulates the charging-power-adjusting instruction by using the magnetic resonance frequency K3 as the carrier wave, and filters out and exports the transmitting terminal controller 614. The transmitting terminal controller 614 is connected to the inverter circuit, and adjusts a transmitting power of the transmitting coil 611 according to the charging-power-adjusting instruction.

During the wireless charging process of the solar panel cleaning robot, to increase use rate of electricity and raise efficiency of wireless charging, the technical issue of how to make the transmitting coil 611 and the receiving coil 612 achieve the optimum effect needs to be solved.

In the present embodiment, the receiving terminal controller 625 detects whether the receiving coil 612 receives a signal in real-time; if a signal is received, the transmitting coil 611 and the receiving coil 612 can implement coupling, and can achieve the effect of wireless charging. However, it may not the optimum coupling status. The receiving terminal controller 625, if receiving signal, detects a signal strength of in the receiving coil 612, and determines relative positions of the receiving coil 612 and the transmitting coil 611 according to the signal strength. The control system 4, according to the relative positions of the receiving coil 612 and the transmitting coil 611, transmits at least one position-adjusting instruction, and controls the cleaning robot to adjust its position such that the receiving coil 612 is located right above the transmitting coil 611. Vertical projections of the transmitting coil 611 and the receiving coil 612 on the solar panel 200 coincide completely with each other such that the transmitting coil 611 and the receiving coil 612 can achieve the optimum coupling effect.

In the present embodiment, a wireless charging method for a solar panel cleaning robot is further provided to solve the technical issues of complicated operation and high maintenance costs of the conventional solar panel cleaning robot.

The wireless charging method of the solar panel cleaning robot of the present embodiment, includes steps as follows: step S501) including: disposing at least one wireless power transmitting device on an internal or a lower portion of at least one solar panel, wherein the wireless power transmitting device includes a transmitting coil; and disposing the transmitting coil on a lower surface of any one solar panel, or, disposing the transmitting coil below a gap of a connection portion of adjacent two solar panels or on an internal of the gap; step S502) including: disposing a wireless power receiving device on the internal or the external of the cleaning robot, wherein the wireless power receiving device includes a receiving coil; and disposing the receiving coil on the bottom layer of the internal of the cleaning robot or on a lower surface of the bottom of the cleaning robot; step S503) including placing the cleaning robot on the solar panel to work normally; wherein during moving of the cleaning robot, when the receiving coil is located right above the transmitting coil, the receiving coil and the transmitting coil implement electromagnetic induction coupling or magnetic resonance coupling; step S504) including the transmitting coil transmitting wireless power to the receiving coil to continuously charge the cleaning robot; step S505) including determining whether the cleaning robot is fully charged; if it is fully charged, stopping charging is implemented; returning to step S503) is then implemented.

The step S503) specifically includes steps as follows: step S5031) including the cleaning robot normally working on the solar panel; step S5032) including the cleaning robot detecting whether the receiving coil generates a current in real-time; if a current is generated, step S5033) is implemented; step S5033) including determining whether the cleaning robot needs charging; if charging is needed, step S5034) is implemented; step S5034) including, according to the current of the receiving coil, determining a relative distance and relative positions of the receiving coil and the transmitting coil; step S5035) including the cleaning robot adjusting its position such that the receiving coil is right above the transmitting coil.

The step S5033) specifically includes steps as follows: step S50331) including acquiring a remaining capacity SOC value of the rechargeable battery in real-time; step S50332) including comparing the remaining capacity SOC value of the rechargeable battery with a predetermined capacity threshold value; if the remaining capacity SOC value of the rechargeable battery is less than a predetermined capacity threshold value (for example, 10% or 15%), it is determined that the cleaning robot needs charging.

The step S505) specifically includes steps as follows: step S5051) including acquiring the remaining capacity SOC value of the rechargeable battery in real-time; step S5052) including comparing the remaining capacity SOC value of the rechargeable battery with a predetermined charging capacity threshold value; if the remaining capacity SOC value of the rechargeable battery is greater than or equal to the predetermined charging capacity threshold value (such as 95% or 100%), it is determined that the cleaning robot has been fully charged.

Advantage of the present embodiment is that multiple wireless charging transmitting devices are disposed on an upper surface, an internal or a nearby place of the solar panel, and multiple wireless charging receiving devices are disposed on the internal or the lower surface of the cleaning robot. During the operating of the cleaning robot on the solar panel, when the cleaning robot moves above wireless charging transmitting device, electromagnetic induction coupling or magnetic resonance coupling is utilized to wirelessly charge the cleaning robot. The entire charging process can be automatically controlled, without the need manually removing the cleaning robot from the solar panel, such that the cleaning robot can operate automatically on the solar panel, automatically charge and automatically power off, which enables automatic continuous operation and reduces management and maintenance costs.

Embodiment 3

Metallic materials may be disposed on the internal or edge of some solar panels. If so, using the technical solution of the embodiment 2 to dispose the transmitting coil 611 on the lower surface of any one solar panel 200 or below the gap 201 of the connection portion of adjacent two solar panels 200 or in the gap 201 and implementing electromagnetic induction coupling between the coils will result in the parts overheated and damaged. At this time, the technical solution of the embodiment 2 is not suitable, and a new technical solution is required to allow the wireless charging system to work.

Figure 39:
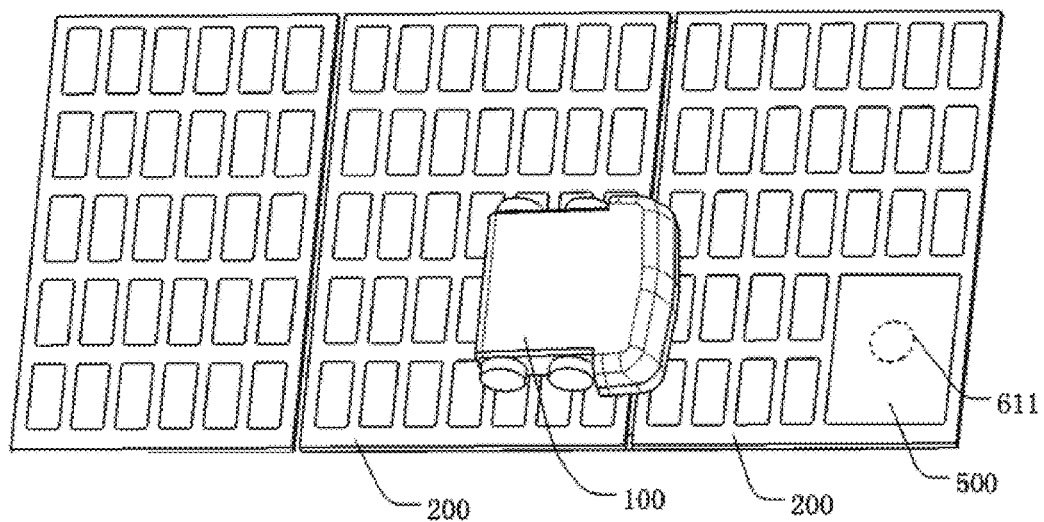
FIG. 39 is a status schematic view of a charging panel of the present invention embodiment 3 embedded in the solar panel.
Figure 40:
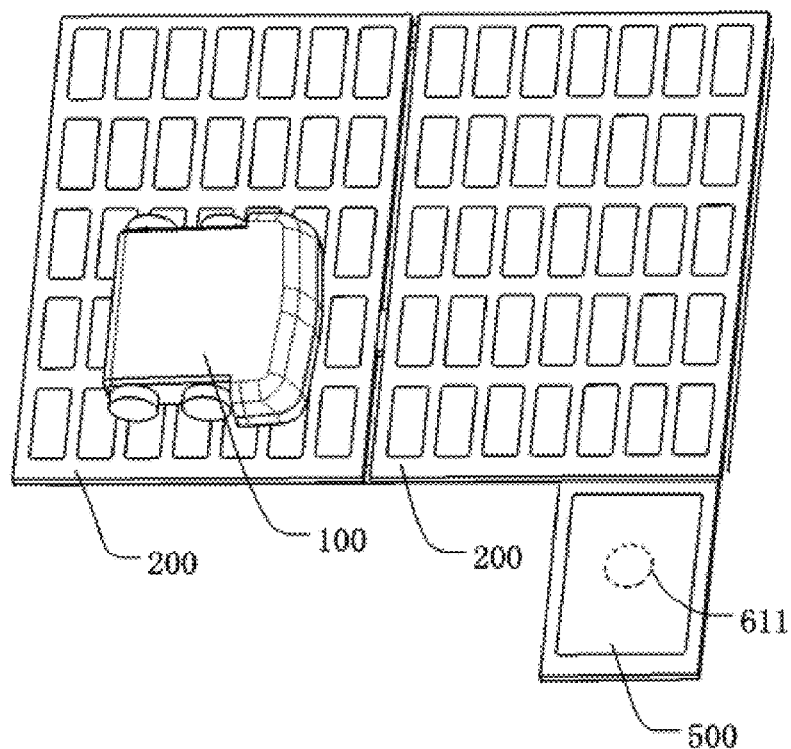
FIG. 40 is a status schematic view of the charging panel installed on an edge of the solar panel of the present invention embodiment 3.

To solve the above issue, with reference to FIGS. 39 and 40, the embodiment 3 provides a solar panel cleaning robot wireless charging system. Most of the technical solutions of the embodiment 3 are the same as those of the embodiment 2, and difference thereof is that the embodiment 3 further includes at least one charging panel 500. Each charging panel 500 is embedded in any one of the solar panels 200 or disposed on an edge of any one of the solar panels 200. An upper surface of the charging panel 500 and an upper surface of the solar panel 200 are in the same plane. The charging panel 500 is made of non-metallic material.

With reference to FIG. 39, "the charging panel 500 is embedded in any one of the solar panels 200" refers to that when the solar panel is manufactured, a specific space is reserved exclusively for embedding the charging panel 500. An upper surface of the embedded the charging panel 500 is flush with the upper surface of the solar panel 200 and both are in the same plane.

With reference to FIG. 40, "the charging panel 500 is disposed on the edge of the solar panel 200" refers to that when the solar panel is manufactured, the charging panel 500 is installed on edges of the solar panel. The upper surface of the charging panel 500 is flush with the solar panel 200, and both are in the same plane.

The transmitting coil 611 may be disposed in any one of the charging panels 500, may be disposed on a lower surface of one of the charging panels 500 instead of being disposed a lower surface of any one of the solar panels or disposed the gap of the connection portion between adjacent two solar panels.

To solve the above issue, the embodiment 3 provides another wireless charging method of the solar panel cleaning robot, the method includes steps as follows: step S601) including: embedding at least one charging panel in at least one solar panel; and/or, disposing at least one charging panel on an edge of the at least one solar panel, wherein an upper surface of the charging panel and an upper surface of the solar panel are in the same plane; step S602) including disposing at least one wireless power transmitting device on an internal or an external of the at least one charging panel, wherein the wireless power transmitting device includes a transmitting coil, the transmitting coil is connected to a power source; and disposing the transmitting coil in any charging panel, or, disposing the transmitting coil on the upper surface of a lower surface of any charging panel; step S603) including disposing a wireless power receiving device on the internal or the external of the cleaning robot, wherein the wireless power receiving device includes a receiving coil; and disposing the receiving coil 612 on the bottom layer of the internal of the cleaning robot or on the lower surface of the bottom of the cleaning robot; step S604) including placing the cleaning robot on the solar panel to work normally; wherein during the moving of the cleaning robot, when the receiving coil is located right above the transmitting coil, the receiving coil and the transmitting coil implement electromagnetic induction coupling or magnetic resonance coupling; step S605) including the transmitting coil transmitting wireless power to the receiving coil to continuously charge the cleaning robot; step S606) including determining whether the cleaning robot is fully charged; if it is fully charged, stopping charging is implemented; returning to step S604) is then implemented.

The step S604) specifically includes steps as follows: step S6041) including the cleaning robot normally working on the solar panel; step S6042) including the cleaning robot detecting whether the receiving coil generates a current in real-time; if a current is generated, step S6043) is implemented; step S6043) including determining whether the cleaning robot needs charging; if charging is needed, step S6044) is implemented; step S6044) including, according to the current of the receiving coil, determining a relative distance and relative positions of the receiving coil and the transmitting coil; step S6045) including the cleaning robot adjusting its position such that the receiving coil is located right above the transmitting coil. During normal operating of the cleaning robot on the solar panel, real-time detection is implemented to determine whether the receiving coil generates current, in other words, it is detected in real-time whether the transmitting coil coupled to the receiving coil exists near the cleaning robot (the receiving coil). When a nearby transmitting coil coupled to the receiving coil is found, it is determined according to the remaining capacity of the rechargeable battery in cleaning robot that whether charging is needed. If charging is needed, the control system controls the cleaning robot to stop operating, and starts to wirelessly charge the rechargeable battery in the cleaning robot.

The step S6043) specifically includes steps as follows: step S60431) including acquiring a remaining capacity SOC value of the rechargeable battery in real-time; step S60432) including comparing the remaining capacity SOC value of the rechargeable battery with a predetermined capacity threshold value; if the remaining capacity SOC value of the rechargeable battery is less than the predetermined capacity threshold value (for example, 10% or 15% or 25%, etc.), it is determined that the cleaning robot needs charging. The predetermined capacity threshold value is ascertained according to distribution of the transmitting coil near the solar panel. The predetermined capacity threshold value should be greater than or equal to a power consumption of the cleaning robot for reaching the next transmitting coil. If the transmitting coil is evenly distributed, the predetermined capacity threshold value should be greater than or equal to a power consumption of the cleaning robot one-way-moving between adjacent two transmitting coils.

The step S606) specifically includes steps as follows: step S6061) including acquiring a remaining capacity SOC value of the rechargeable battery in real-time; step S6062) including comparing the remaining capacity SOC value of the rechargeable battery 622 with a predetermined charging capacity threshold value; if the remaining capacity SOC value of the rechargeable battery 622 is greater than or equal to the predetermined charging capacity threshold value (for example, 95% or 100%), it is determined that the cleaning robot has been fully charged, and the charging is stopped. The control system of the cleaning robot starts the power system and the cleaning device to control the cleaning robot to continue to work.

Advantage of the present embodiment is that 獨立設置 a charging panel is disposed independently and is located in the same plane with the solar panel. Even though metallic material exists on the solar panel, the receiving coil and the transmitting coil can still implement electromagnetic induction coupling to achieve wireless charge to the robot. The entire charging process can be automatically controlled without manually removing the cleaning robot from the solar panel such that the cleaning robot can operate automatically on the solar panel, automatically charge and automatically power off, which enables automatic continuous operation and reduces management and maintenance costs.

The above is only the preferred embodiment of the present invention. It should be noted that those skilled in the art, without departing from the principle of the present invention, can also make some improvements and modifications, these improvements and modifications should be deemed as the protection scope of the present invention.

What is claimed is:

1. A solar panel cleaning robot, comprising:
   a robot body moving or stopping on at least one solar panel, and the robot body comprising:
      a cleaning device disposed on an internal or an external of the robot body, and configured to clean a solar panel;
      a power system disposed on the internal or the external of the robot body, and configured to adjust a moving direction and a moving speed of the robot body on the solar panel;
      a control system disposed on the internal or the external of the robot body, and connected to the power system and the cleaning device; and
      an electric power system disposed on the internal or the external of the robot body, connected to the power system, the cleaning device and the control system, and configured to provide the power system, the cleaning device and the control system with electricity;
   a data acquisition system configured to acquire at least one working parameter during moving of the robot body;
   a processor connected to the data acquisition system, and configured to transmit at least one moving-control instruction to the power system, and to transmit at least one cleaning-control instruction to the cleaning device, wherein the power system controls the robot body to move or stop according to the moving-control instruction, and the cleaning device cleans or stops cleaning the solar panel according to the cleaning-control instruction; and
   at least one storage unit connected to the processor, and configured to store the working parameter during the moving of the robot body;
   wherein the data acquisition system comprises at least one image sensor or camera connected to the processor, disposed on a front end of the robot body, and configured to acquire images in front of the robot body during the moving of the robot body; wherein the cleaning device comprises:
      a cleaning motor comprising a cleaning motor shaft;
      a roller brush having a roller brush driven shaft disposed on a center of the roller brush;
      a transmission mechanism connected to both the cleaning motor shaft and the roller brush driven shaft, the cleaning motor shaft driving the roller brush driven shaft to rotate through the transmission mechanism;
      a liquid dispensing container being a detachable sealing container and having a drainage outlet disposed on a bottom of the liquid dispensing container;
      at least one nozzle head disposed above the roller brush or on a side of the roller brush; each nozzle head comprising a nozzle, and the nozzle facing the roller brush;
      a forked pipe comprising a main pipe and at least one branch pipe communicating with each other, the main pipe communicating with the drainage outlet, and each branch pipe communicating with a nozzle head; and a water pump disposed on the main pipe; wherein the liquid dispensing container comprises: a column-shaped portion;
      a taper portion having a bottom surface connected to a lower bottom surface of the column-shaped portion; and
      the drainage outlet, further disposed on a top point of the taper portion, wherein liquid in the liquid dispensing container and the taper portion are collectively structured and configured to move liquid downward from the column-shaped portion, flow downward out of the taper portion and flow downward into the drainage outlet;
   wherein the control system, according to requirement, transmits at least one water pump control signal to the water pump, switches on the water pump and adjusts water-pumping speed of the water pump to make the liquid in the liquid dispensing container flow out to the nozzle head through the forked pipe and form tiny liquid droplets being radially sprayed to the rover brush, and the roller brush drives the liquid to fall onto the solar panel while the roller brush is used to clean the solar panel.

2. The solar panel cleaning robot as claimed in claim 1, wherein the transmission mechanism comprises:
   a driving gear disposed on the cleaning motor shaft;
   a driven gear disposed on the roller brush driven shaft; and
   a double gear comprising
   a large gear ring engaged with the driving gear; and
   a small gear ring engaged with the driven gear.

3. The solar panel cleaning robot as claimed in claim 1, wherein the liquid dispensing container further comprises:
   a container cover securely installed on an upper bottom surface of the column-shaped portion;
   a fill inlet extending through the container cover;
   a fill inlet lid detchably installed on the fill inlet; and
   a bidirectional pressure relief valve installed through the fill inlet lid.

4. The solar panel cleaning robot as claimed in claim 1, wherein the power system comprises:
- a left-front wheel installed on a left side of a front portion of a bottom surface of the robot body, and comprising: a left-front wheel hub; and a left-front wheel axis disposed on a center of the left-front wheel hub;
- a right-front wheel installed on a right side of the front portion of the bottom surface of the robot body, and comprising: a right-front wheel hub; and a right-front wheel axis disposed on a center of the right-front wheel hub;
- a left-drive motor installed on a bottom portion of the robot body, and comprising: a left-drive shaft connected to the left-front wheel axis and configured to control a rotating speed and a rotational direction of the left-front wheel; and,
- a right-drive motor installed on the bottom portion of the robot body, and comprising:
a right-drive shaft connected to the right-front wheel axis and configured to control a rotating speed and a rotational direction of the right-front wheel.

5. The solar panel cleaning robot as claimed in claim 4, wherein the power system further comprises:
- a left-rear wheel installed on a left side of a rear portion of the bottom surface of the robot body, and comprising: a left-rear wheel hub disposed on a same straight line with the left-front wheel hub; and a left-rear wheel axis disposed on a center of the left-rear wheel hub;
- a right-rear wheel installed on a right side of the rear portion of the bottom surface of the robot body, and comprising: a right-rear wheel hub disposed on a same straight line with the right-front wheel hub; and a right-rear wheel axis disposed on a center of the right-rear wheel hub; and,
- two tracks, each of the tracks being a flexible link loop, wherein one of the tracks covers an outer portion of an annular sidewall of the left-front wheel hub and an outer portion of an annular sidewall of the left-rear wheel hub; the other track covers an outer portion of an annular sidewall of the right-front wheel hub and an outer portion of an annular sidewall of the right-rear wheel hub.

6. The solar panel cleaning robot as claimed in claim 5, wherein the power system further comprises:
- at least one hub gear evenly disposed on surfaces of the outer portions of the annular sidewalls of the left-front wheel hub, the left-rear wheel hub, the right-front wheel hub and the right-rear wheel hub;
- at least one track inner tooth evenly disposed on a surface of an inner sidewall of each track, the track inner tooth engaged with the hub gear; and
- at least one skid-proof block protruding from an outer sidewall of each track; or, at least one skid-proof pattern recessed in the outer sidewall of each track.

7. The solar panel cleaning robot as claimed in claim 5, wherein the power system further comprises at least one track tension device; each track tension device comprising:
- an upper transmission belt being an upper portion of the track, and at least one track inner tooth disposed on a lower surface of the upper transmission belt;
- a lower transmission belt being a lower portion of the track, at least one track inner tooth disposed on an upper surface of the lower transmission belt;
- an upper tension portion having an upper end disposed tangentially to or engaged with the lower surface of the upper transmission belt, and configured to tension the upper transmission belt;
- a lower compression portion having a lower end disposed tangentially to the upper surface of the lower transmission belt, and configured to tension the lower transmission belt; and
- a resilient support portion having an end connected to the upper tension portion and another end connected to the lower compression portion, and configured to support the upper tension portion and the lower compression portion.

8. The solar panel cleaning robot as claimed in claim 7, wherein the track tension device further comprises:
- one or two track side plates disposed on a side or two sides of the track;
- at least one longitudinal slot perpendicularly disposed in an upper portion of the track side plate;
- at least one installing shaft, an end of each installing shaft up-and-down-slidably disposed in one longitudinal slot; or, two ends of each installing shaft up-and-down-slidably disposed respectively in opposite two of the longitudinal slots, and the opposite two of the longitudinal slots located respectively on the two track side plates.

9. The solar panel cleaning robot as claimed in claim 8, wherein
the installing shaft comprising at least one gear installation shaft and at least one transmission-wheel installation shaft;
the upper tension portion comprises:
- at least one tension gear, each tension gear installed on one gear installation shaft through a roller bearing, and an upper end of the tension gear engaged with the lower surface of the upper transmission belt;
- at least one tension transmission wheel, each tension transmission wheel installed on a transmission-wheel installation shaft through a roller bearing, and disposed tangentially to or engaged with the tension gear; and
- a V-shaped bracket, two transmission-wheel installation shafts disposed respectively on two ends of an upper portion of the V-shaped bracket, and a gear installation shaft disposed above the V-shaped bracket;
wherein the gear installation shaft and the transmission-wheel installation shafts parallel one another, the gear installation shaft is located above a middle place between the two transmission-wheel installation shafts.

10. The solar panel cleaning robot as claimed in claim 7, wherein
the lower compression portion comprises at least one tension compression plate disposed tangentially to the lower transmission belt;
the resilient support portion comprises a reverse V-shaped resilient element, a corner of an upper portion of the reverse V-shaped resilient element connected to a lower end of the upper tension portion, and two ends of a lower portion of the reverse V-shaped resilient element connected respectively to two tension compression plates.

11. The solar panel cleaning robot as claimed in claim 1, wherein the data acquisition system comprises at least one accelerometer sensor connected to the processor, and configured to acquire at least one acceleration data of the robot body in real-time;
the processor determines whether the robot body moves linearly according to the acceleration data of the robot body; if the robot body is deflected, the processor transmits at least one direction-adjusting instruction to the power system according to the acceleration data.

12. The solar panel cleaning robot as claimed in claim 1, wherein the data acquisition system comprises a magnetic sensor connected to the processor and configured to acquire the robot body at least one moving direction data in real-time;
- the processor determines whether the robot body moves linearly according to the moving direction data of the robot body; if the robot body is deflected, the processor transmits at least one direction-adjusting instruction to the power system according to the moving direction data.

13. The solar panel cleaning robot as claimed in claim 1, wherein the data acquisition system comprises at least one distance sensor disposed on an outer edge of the robot body and connected to the processor; the distance sensor is configured to acquire at least one distance data of the distance sensor and the solar panel in real-time; the processor determines whether the robot body is located on an edge or a corner of the solar panel according to the distance data.

14. The solar panel cleaning robot as claimed in claim 1, wherein the data acquisition system comprises a liquid level sensor disposed in a liquid dispensing container, the liquid level sensor is connected to the processor, and the liquid level sensor is configured to acquire liquid level data in the liquid dispensing container in real-time.

15. The solar panel cleaning robot as claimed in claim 1, wherein the control system further comprises at least one wireless communication system wirelessly connected to a server and configured to build communication between the solar panel cleaning robot and the server.

16. The solar panel cleaning robot as claimed in claim 1 further comprising at least one wireless charging system comprising
- a rechargeable battery disposed on the internal of the robot body and configured to provide power;
- at least one wireless power transmitting device disposed on the external of the robot body; each wireless power transmitting device comprising a transmitting coil, and the transmitting coil connected to a power source; and
- a wireless power receiving device disposed on the external or an outer surface of the robot body; the wireless power receiving device comprising a receiving coil, and the receiving coil connected to the rechargeable battery;
- wherein when the receiving coil is located above the transmitting coil, the receiving coil and the transmitting coil implement electromagnetic induction coupling or magnetic resonance coupling such that the transmitting coil transmits wireless electric power to the receiving coil.

17. The solar panel cleaning robot as claimed in claim 16, wherein the transmitting coil is disposed on a lower surface of one solar panel, or, disposed under or in a gap on a connection portion of adjacent two solar panels; the receiving coil is disposed on a bottom layer in the solar panel cleaning robot, or, disposed on a lower surface of a bottom portion of the solar panel cleaning robot.

18. The solar panel cleaning robot as claimed in claim 16, wherein
- the wireless charging system further comprises
- at least one charging panel, each charging panel embedded in one solar panel or disposed an edge of one solar panel; an upper surface of the charging panel and an upper surface of the solar panel are in a same plane;
- wherein the transmitting coil is disposed in one charging panel, or, disposed on an upper surface or a lower surface of one charging panel; the receiving coil is disposed on a bottom layer in the cleaning robot, or, disposed on a lower surface of a bottom portion of the cleaning robot.

19. The solar panel cleaning robot as claimed in claim 16, wherein when the receiving coil is coupled to the transmitting coil, a distance between the transmitting coil and the receiving coil is 1 mm to 40 mm; a medium between the transmitting coil and the receiving coil is non-metallic.

\* \* \* \* \*